United States Patent
Hosoya

(10) Patent No.: US 7,821,587 B2
(45) Date of Patent: Oct. 26, 2010

(54) DISPLAY DEVICE AND MANUFACTURING METHOD OF DISPLAY DEVICE

(75) Inventor: Kunio Hosoya, Kanagawa (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 276 days.

(21) Appl. No.: 11/599,347

(22) Filed: Nov. 15, 2006

(65) Prior Publication Data

US 2007/0126955 A1     Jun. 7, 2007

(30) Foreign Application Priority Data

Dec. 1, 2005     (JP)     ............................. 2005-347661

(51) Int. Cl.
G02F 1/136     (2006.01)
G02F 1/1335     (2006.01)

(52) U.S. Cl. .......................................... 349/43; 349/106

(58) Field of Classification Search ...................... 349/43
See application file for complete search history.

(56) References Cited

U.S. PATENT DOCUMENTS

| | | | |
|---|---|---|---|
| 6,574,487 B1 | 6/2003 | Smith et al. | |
| 7,023,518 B1 | 4/2006 | Koyama et al. | |
| 2003/0117550 A1* | 6/2003 | Kang et al. | 349/106 |
| 2004/0027525 A1* | 2/2004 | Itakura et al. | 349/141 |

FOREIGN PATENT DOCUMENTS

| | | |
|---|---|---|
| JP | 09-171192 | 6/1997 |
| JP | 2001-298519 | 10/2001 |
| JP | 2003-098545 | 4/2003 |

* cited by examiner

*Primary Examiner*—Uyen-Chau N Le
*Assistant Examiner*—Kajli Prince
(74) *Attorney, Agent, or Firm*—Nixon Peabody LLP; Jeffrey L. Costellia

(57) ABSTRACT

It is an object of the present invention to realize thinning, low power consumption, and improvement of an yield at the time of manufacture of a display device capable of double-sided display which is used for a piece of portable informational terminal equipment such as a cellular phone. A liquid crystal display device, including a first substrate 1a and a second substrate 1b, has a transmission type active-matrix first liquid crystal display device 3001 and a reflective type active-matrix second liquid crystal display device 3002, where the first substrate has a TFT region of the first liquid crystal display device and an opposite region of the second liquid crystal display device, and the second substrate has an opposite region of the first liquid crystal display device and a TFT region of the second liquid crystal display device.

12 Claims, 36 Drawing Sheets

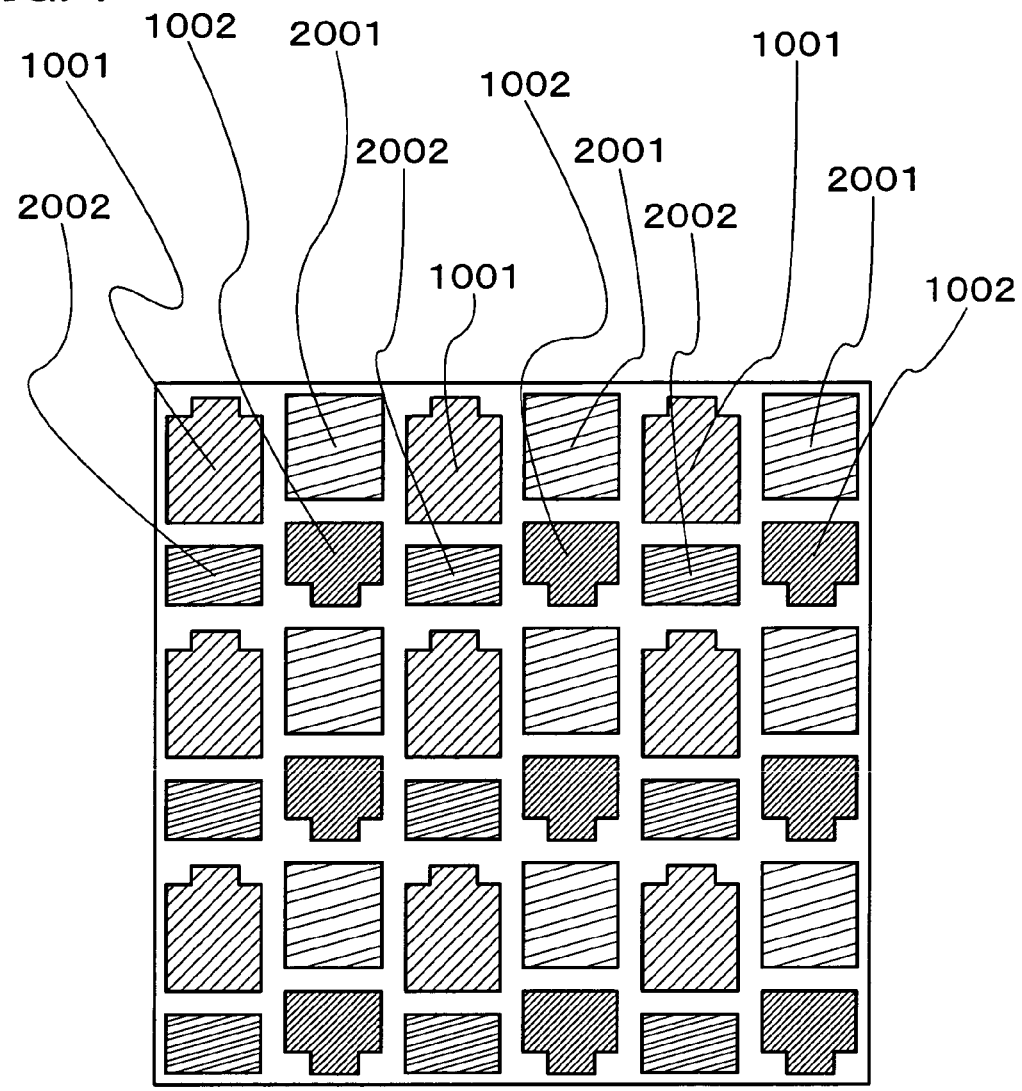

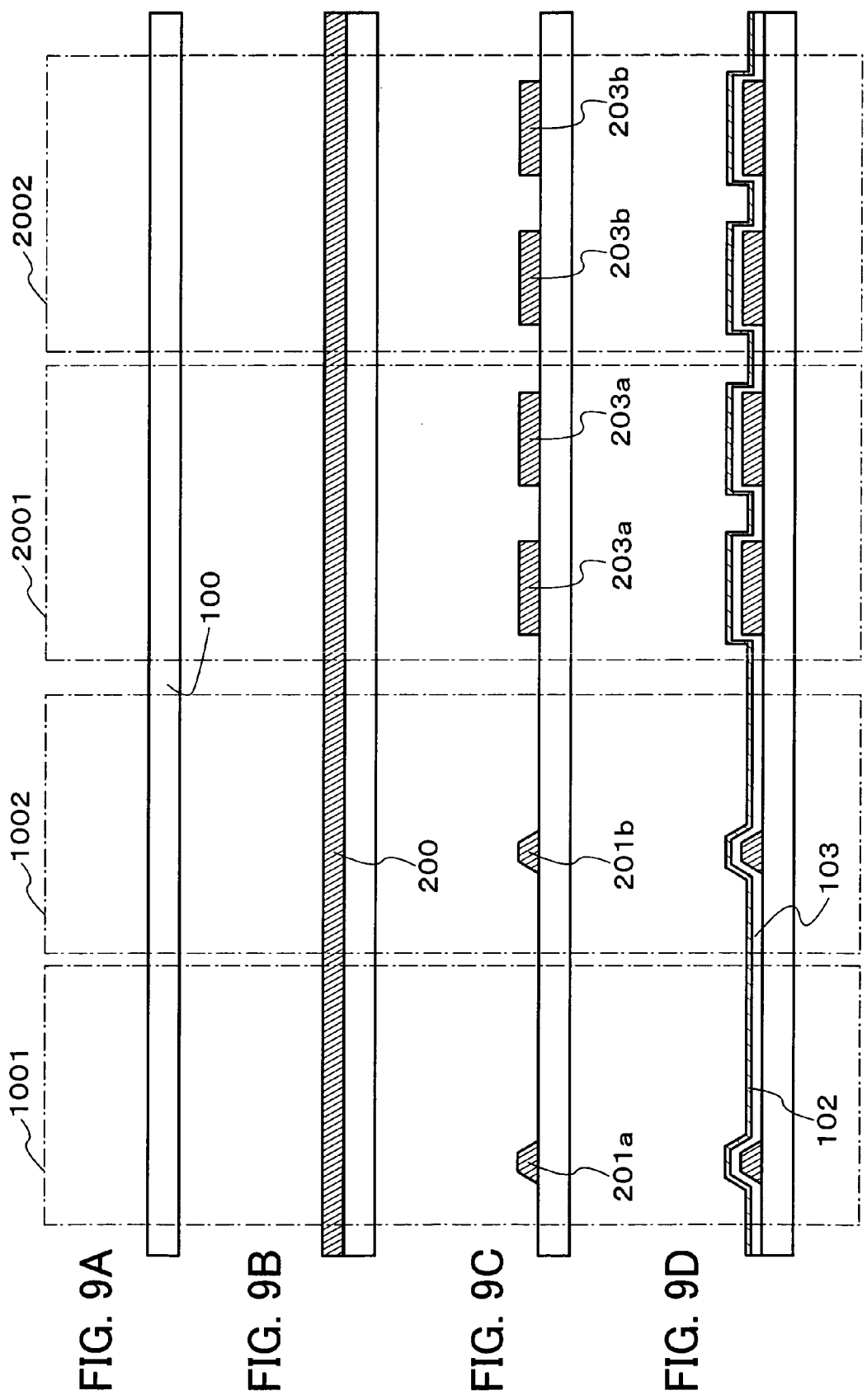

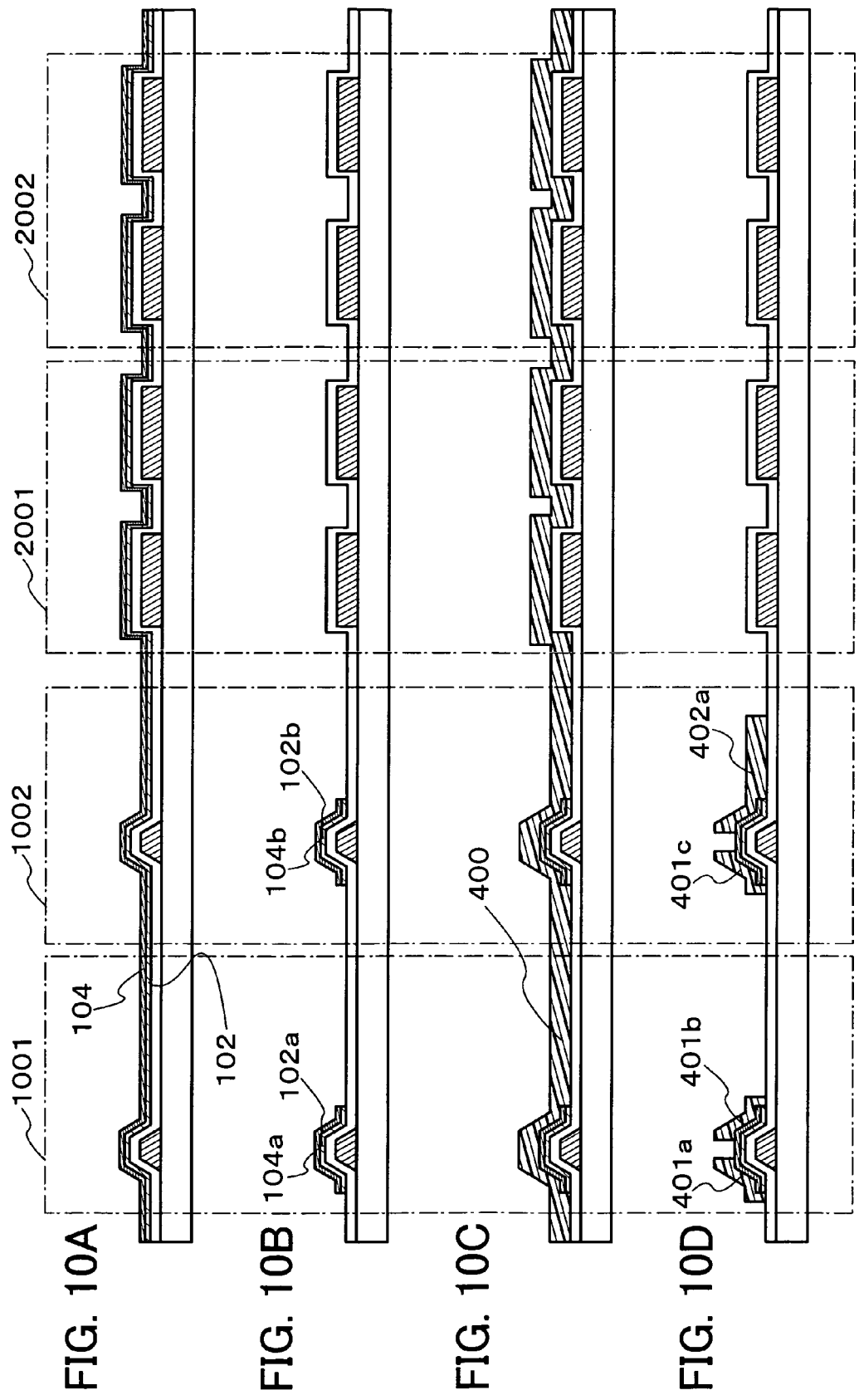

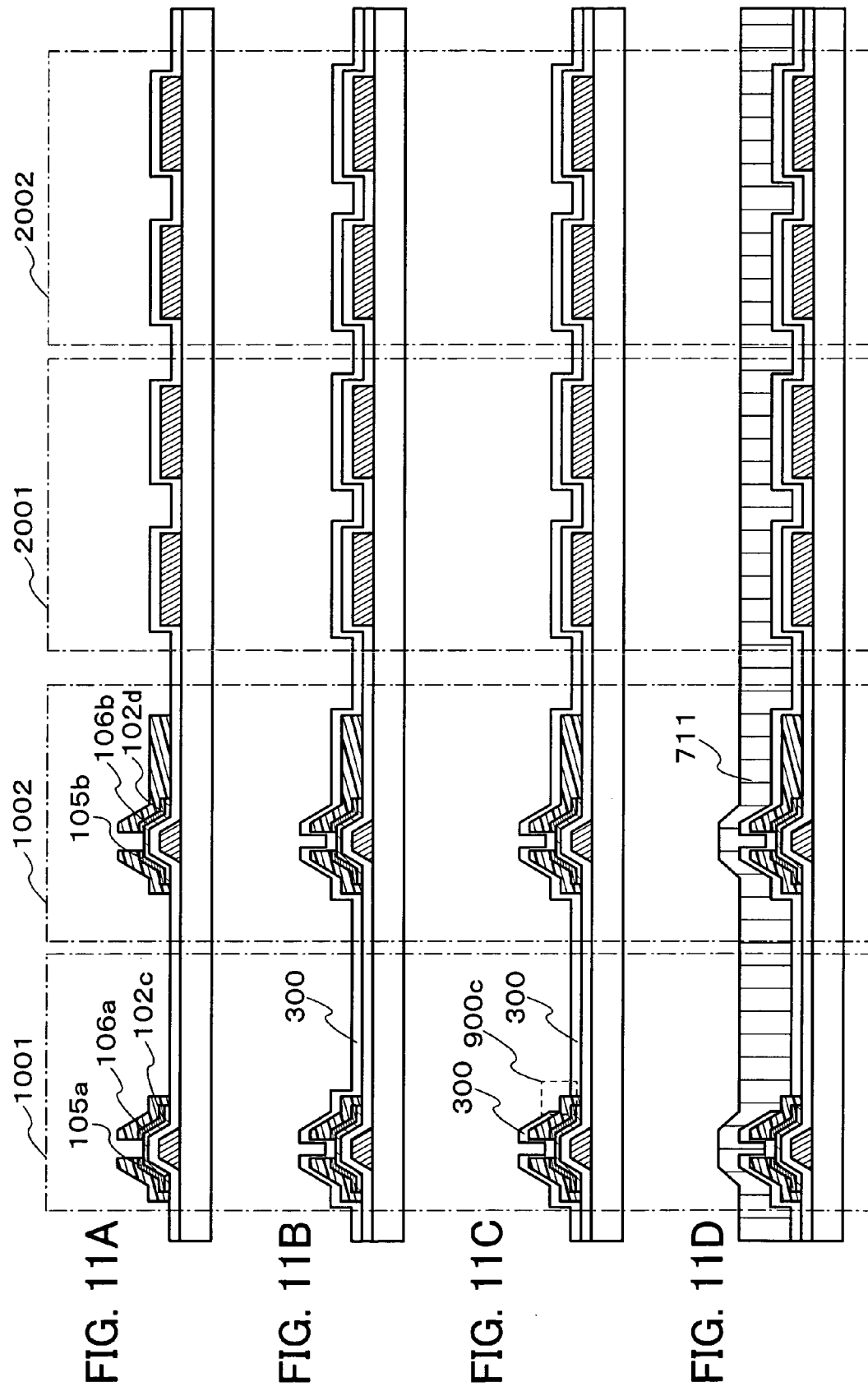

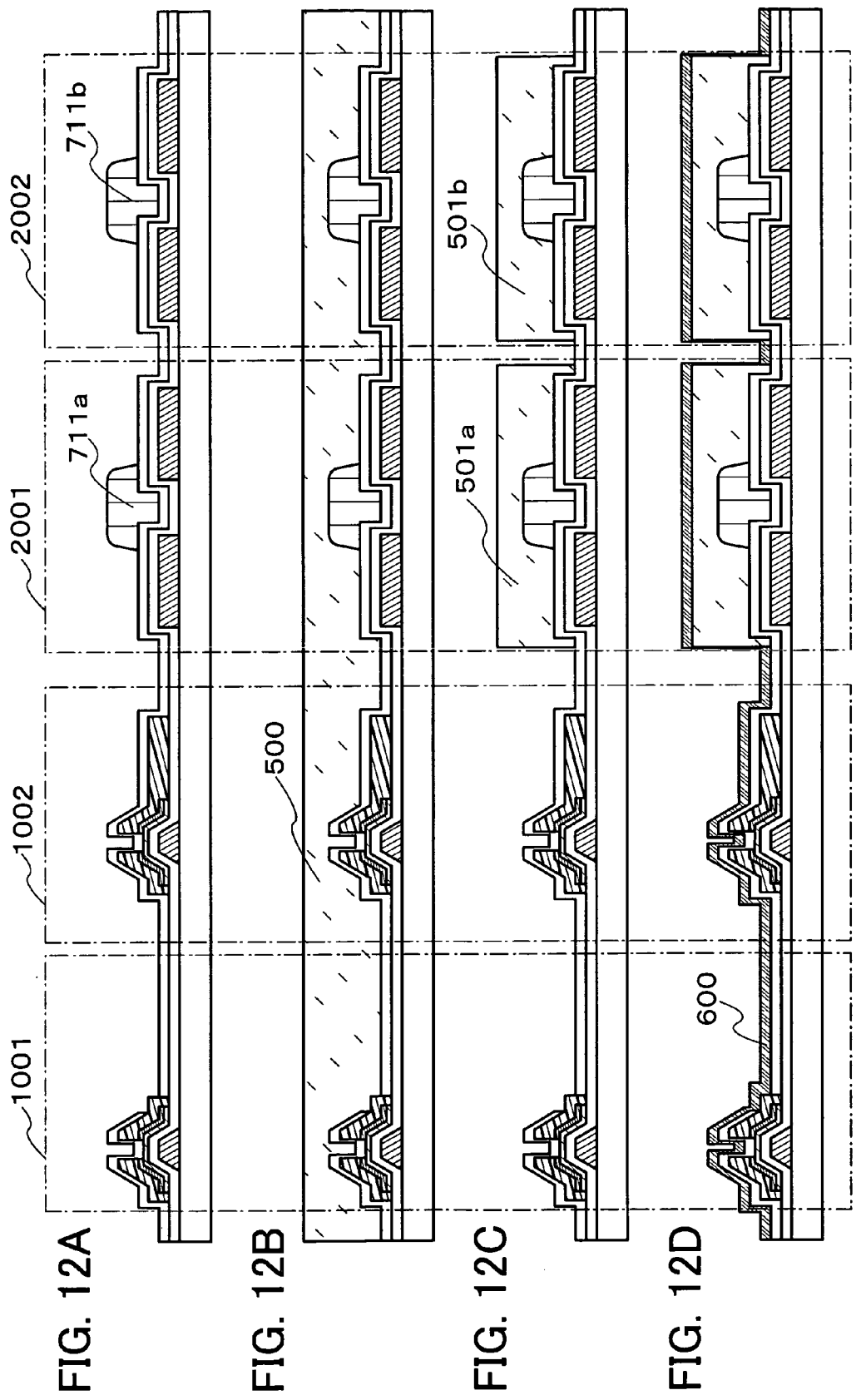

DISPLAY DEVICE AND MANUFACTURING METHOD OF DISPLAY DEVICE

BACKGROUND OF THE INVENTION

1. Field of the Invention

The present invention relates to a display device capable of double-sided display by being used for portable informational terminal equipment such as a cellular phone, and to a manufacturing method thereof.

2. Description of the Related Art

In a conventional cellular phone, a cellular phone having a main display and a back-face display (a sub-display) for notifying arrival of an e-mail or time has been widely employed.

For example, there is a cellular phone having a structure where both a main display and a sub-display are transmission type liquid crystal panels. In this structure, both sides of one backlight device are each provided with a liquid crystal panel (for example, see Reference 1: Japanese Published Patent Application No. 2001-298519).

In addition, there is an active-matrix liquid crystal display device using an active element such as a thin film transistor (hereinafter, referred to as a "TFT") (for example, see Reference 2: Japanese Published Patent Application No. H9-171192).

SUMMARY OF THE INVENTION

However, four substrates are used in the structure where both sides of one backlight device are each provided with one liquid crystal panel. In addition, a thickness of a display device gets thicker than the total thickness of the four substrates and the thickness of the backlight. Since there is a demand for thinning a piece of portable informational terminal equipment or the like, it is necessary to manufacture the display device much thinner.

In addition, an active-matrix liquid crystal display device has the following structure: an alignment film, a spacer, and liquid crystals are interposed between a substrate, where a region having an electric circuit in which an element such as a TFT, a capacitor, or a resistor is disposed (a TFT region) is formed, and a substrate, where a region having a color filter, a black matrix, or an electrode for applying a voltage to the liquid crystals (an opposite region) is formed. Therefore, in order to manufacture one liquid crystal display device, it is necessary to prepare two substrates, and to separately manufacture the substrate where the TFT region is formed and the substrate where the opposite region is formed.

Thus, in the conventional technique, there is a problem that the total number of device processing times of the number of device processing times of a substrate having a TFT or the like and the number of device processing times of a substrate having a color filter or the like becomes increased.

The increase in the total number of device processing times results in decrease of a yield and also in increase of a cost.

The "number of device processing times" refers to the number of times that a substrate is processed in a device until a liquid crystal display device is completed. The same can be said for the following description.

In view of the above problems, it is an object of the present invention to provide a thin liquid crystal display device capable of double-sided display and a manufacturing method thereof for improving the yield.

A structure of a liquid crystal display device or a substrate for manufacturing a liquid crystal display device of the present invention will be described.

The "substrate for manufacturing a liquid crystal display device" refers to a substrate where at least one of the above TFT region or opposite region is formed.

The "TFT region" refers to a region having at least an electric circuit in which a TFT for controlling liquid crystal display, a wiring that connects TFTs, and a pixel electrode (hereinafter, referred to as a "TFT and the like") are disposed. In addition, even in a case where other structural elements (for example, a wiring that connects TFTs, a pixel electrode, a capacitor element, a resistive element, an interlayer insulating film, a color filter, a black matrix, or the like) are included in the electric circuit, a region having such an electric circuit is included in the "TFT region", as long as a TFT for controlling liquid crystal display and the like are included in the electric circuit.

The "opposite region" refers to a region having at least an opposite electrode. In addition, even in a case where an interlayer insulating film, a color filter, a black matrix, or the like is included in the region, such a region is included in the "opposite region", as long as an opposite electrode is included.

Here, an electrode for applying a voltage to liquid crystals is regarded as a "pixel electrode" and an "opposite electrode". In addition, an electrode where a voltage is controlled by a TFT or the like for controlling display is regarded as a "pixel electrode". On the other hand, an electrode located on the opposite side of the pixel electrode, where a constant voltage is applied during display without controlling a voltage, is regarded as an "opposite electrode".

A liquid crystal display device or a substrate for manufacturing a liquid crystal display device according to the present invention has the following structure: a first TFT region having a first gate electrode; a second TFT region, a second gate electrode; a first opposite region, a first black matrix; and a second opposite region, a second black matrix, where the first gate electrode, the second gate electrode, the first black matrix, and the second black matrix are formed in the same layer.

A "black matrix" serves to prevent light leakage (light exclusion) by edging a vicinity of each dot of RGB (red, green, and blue) color filters with black like a window frame. Simultaneously, the black matrix serves to improve a contrast or prevention of color mixture at the time of manufacturing.

Here, when thin films that are simultaneously formed are processed using a mask pattern transferring technique to form N-regions (N is a natural number of greater than or equal to 2) of $A_1$ to $A_N$, the following description is to be made: "$A_1$, $A_2$, ..., and $A_N$ are formed in the same layer". For example, when a first electrode, a second electrode, a first wiring, and a second wiring are formed by a mask pattern transferring technique after forming a conductive film, the following description is to be made: "a first electrode, a second electrode, a first wiring, and a second wiring are formed in the same layer". In addition, when "$A_1$, $A_2$, ..., and $A_N$ are formed in the same layer", "$A_1$, $A_2$, ..., and $A_N$ are formed from the same material".

Here, the "film formation" refers to forming a desired substance over an entire surface of a substrate. For example, there is a method for forming a desired substance over an entire surface of a substrate by a CVD method, a PVD method, a vapor deposition method, or the like, and a method for forming a film with the use of a liquid material such as a spin coating or a slit type is also to be included. However, the present invention is not limited to these exemplified methods, and other technique means capable of forming a desired substance over an entire surface of a substrate is also to be included in the related technical field. The same can be said for the following description.

In addition, a "mask pattern" is a geometrical pattern of a mask. A mask pattern is determined by an element and an electric circuit configuration to be manufactured. The same can be said for the following description.

Moreover, a "mask pattern transferring technique" refers to a technique of forming a desired mask pattern with a desired substance. For example, there is a method for processing a desired shape with a desired substance by forming a temporary mask, etching a portion that is not covered with the mask, and thereafter removing the temporary mask by a lithography method, an ink-jet method, a nano-imprinting method, or the like. Alternatively, there is a method for processing a photo-sensitive organic film (for example, resist, acrylic, polyimide, or the like) into a desired shape by exposing and then developing a mask pattern to remove the exposed portion. In addition, there is also a method for directly forming a desired mask pattern with a desired substance by an ink-jet method, a nano-imprinting method, or the like. However, the present invention is not limited to these exemplified methods, and other technique means capable of forming a desired mask pattern with a desired substance is to also be included in the related technical field. The same can be said for the following description.

Note that a method for processing a desired shape with a desired substance has been widely employed, where, after forming a film, a temporary mask is formed, a portion not covered with the mask is etched, and then the temporary mask is removed by a lithography method. By using this method, in an electric circuit where an element such as a TFT, a capacitor, or a resistor is disposed, a desired substance is once formed over an entire surface of a substrate and then the desired substance is processed into a desired mask pattern; therefore, it is possible to form separate elements at the same time with the same material.

Another liquid crystal display device or substrate for manufacturing a liquid crystal display device according to the present invention has the following structure: a first TFT region having a first wiring; a second TFT region, a second wiring; a first opposite region, a first black matrix; and a second opposite region, a second black matrix, where the first wiring, the second wiring, the first black matrix, and the second black matrix are formed in the same layer.

Another liquid crystal display device or substrate for manufacturing a liquid crystal display device according to the present invention has a second TFT region having a black matrix.

Another liquid crystal display device or substrate for manufacturing a liquid crystal display device according to the present invention has the following structure: a first TFT region having a first black matrix and a second TFT region having a second black matrix, where the first black matrix and the second black matrix are formed in the same layer.

Another liquid crystal display device or substrate for manufacturing a liquid crystal display device according to the present invention has the following structure: a first TFT region having a first gate electrode and a second TFT region having a second gate electrode and a reflective electrode, where the first gate electrode, the second gate electrode, and the reflective electrode are formed in the same layer.

Another liquid crystal display device or substrate for manufacturing a liquid crystal display device according to the present invention has the following structure: a first TFT region having a first wiring and a second TFT region having a second wiring and a reflective electrode, where the first wiring, the second wiring, and the reflective electrode are formed in the same layer.

Another liquid crystal display device or substrate for manufacturing a liquid crystal display device according to the present invention has the following structure: a first TFT region having a first gate electrode; a second TFT region, a second gate electrode; and a second opposite region, a reflective electrode, where the first gate electrode, the second gate electrode, and the reflective electrode are formed in the same layer.

Another liquid crystal display device or substrate for manufacturing a liquid crystal display device according to the present invention has the following structure: a first TFT region having a first wiring; a second TFT region, a second wiring; and a second opposite region, a reflective electrode, where the first wiring, the second wiring, and the reflective electrode are formed in the same layer.

Another liquid crystal display device or substrate for manufacturing a liquid crystal display device according to the present invention has the following structure: a first TFT region having a first transparent electrode; a first opposite region, a second transparent electrode; and a second opposite electrode, a third transparent electrode, where the first transparent electrode, the second transparent electrode, and the third transparent electrode are formed in the same layer.

Another liquid crystal display device or substrate for manufacturing a liquid crystal display device according to the present invention has the following structure: a first TFT region having a first transparent electrode; a first opposite region, a second transparent electrode; and a second TFT region, a third transparent electrode, where the first transparent electrode, the second transparent electrode, and the third transparent electrode are formed in the same layer.

Another liquid crystal display device or substrate for manufacturing a liquid crystal display device according to the present invention has the following structure: a first TFT region having a first transparent electrode; a second TFT region, a second transparent electrode; a first opposite region, a third transparent electrode; and a second opposite region, a fourth transparent electrode, where the first transparent electrode, the second transparent electrode, the third transparent electrode, and the fourth transparent electrode are formed in the same layer.

Another liquid crystal display device or substrate for manufacturing a liquid crystal display device according to the present invention has the following structure: a first opposite region having a first interlayer insulating film and a second opposite region having a second interlayer insulating film, where the first interlayer insulating film and the second interlayer insulating film are formed in the same layer.

Another liquid crystal display device or substrate for manufacturing a liquid crystal display device according to the present invention has the following structure: a first TFT region having a first interlayer insulating film; a second TFT region, a second interlayer insulating film; a first opposite region, a third interlayer insulating film; and a second opposite region, a fourth interlayer insulating film, where the first interlayer insulating film, the second interlayer insulating film, the third interlayer insulating film, and the fourth interlayer insulating film are formed in the same layer.

Another liquid crystal display device or substrate for manufacturing a liquid crystal display device according to the present invention has the following structure: a first opposite region having a first transparent electrode, a first red color filter, a first green color filter, and a first blue color filter; a second opposite region having a second transparent electrode; and a second TFT region having a second red color filter, a second green color filter, and a second blue color filter. The first transparent electrode is formed on the first red color filter, the first green color filter, and the first blue color filter to be in contact; the second transparent electrode is formed on the second red color filter, the second green color filter, and the second blue color filter to be in contact; the first red color filter and the second red color filter are formed in the same layer; the first green color filter and the second green color filter are formed in the same layer; the first blue color filter and the second blue color filter are formed in the same layer; and the first transparent electrode and the second transparent electrode are formed in the same layer.

Another liquid crystal display device or substrate for manufacturing a liquid crystal display device according to the present invention has the following structure: a first opposite region having a first red color filter, a first green color filter, a first blue color filter, and a first transparent electrode; and a second TFT region having a second red color filter, a second green color filter, a second blue color filter, a second transparent electrode, a third transparent electrode, and a fourth transparent electrode. The first red color filter, the first green color filter, and the first blue color filter are formed below the first transparent electrode to be in contact; the second red color filter is formed below the second transparent electrode; the second green color filter is formed below the third transparent electrode; the second blue color filter is formed below the fourth transparent electrode; the first red color filter and the second red color filter are formed in the same layer; the first green color filter and the second green color filter are formed in the same layer; the first blue color filter and the second blue color filter are formed in the same layer; and the materials of the first transparent electrode, the second transparent electrode, the third transparent electrode, and the fourth transparent electrode are formed in the same layer.

Another liquid crystal display device or substrate for manufacturing a liquid crystal display device according to the present invention has the following structure: a first TFT region having a first red color filter, a first green color filter, a first blue color filter, a first transparent electrode, a second transparent electrode, and a third transparent electrode; and a second TFT region having a second red color filter, a second green color filter, a second blue color filter, a fourth transparent electrode, a fifth transparent electrode, and a sixth transparent electrode. The first red color filter and the second red color filter are made of the same substance; the first green color filter and the second green color filter are formed in the same layer; the first blue color filter and the second blue color filter are formed in the same layer; the first transparent electrode, the second transparent electrode, the third transparent electrode, the fourth transparent electrode, the fifth transparent electrode, and the sixth transparent electrode are formed in the same layer.

Another liquid crystal display device or substrate for manufacturing a liquid crystal display device according to the present invention has the following structure: a first TFT region having a first interlayer insulating film including a first black matrix, a first red color filter, a first green color filter, and a first blue color filter; a first transparent electrode; a second transparent electrode; and a third transparent electrode, and a second TFT region having a second interlayer insulating film; a first interlayer insulating film including a second black matrix, a second red color filter, a second green color filter, and a second blue color filter; a fourth transparent electrode; a fifth transparent electrode; and a sixth transparent electrode. The first red color filter is disposed below the first transparent electrode; the first green color filter is disposed below the second transparent electrode; the first blue color filter is disposed below the third transparent electrode; the second red color filter is disposed below the fourth transparent electrode; the second green color filter is disposed below the fifth transparent electrode; the second blue color filter is disposed below the sixth transparent electrode; the first black matrix and the second black matrix are disposed in the same layer; the first red color filter and the second red color filter are disposed in the same layer; the first green color filter and the second green color filter are disposed in the same layer; the first blue color filter and the second blue color filter are disposed in the same layer; and the first transparent electrode, the second transparent electrode, the third transparent electrode, the fourth transparent electrode, the fifth transparent electrode, and the sixth transparent electrode are disposed in the same layer.

A liquid crystal display device according to the present invention has a first substrate and a second substrate, where the first substrate has a first TFT region and a second opposite region, and the second substrate has a second TFT region and a first opposite region.

Another liquid crystal display device according to the present invention has a first substrate and a second substrate, where the first substrate has a first TFT region and a second TFT region, and the second substrate has a first opposite region and a second opposite region.

Another liquid crystal display device according to the present invention, which includes a first substrate and a second substrate, has a transmission type active-matrix first liquid crystal display device and a reflective type active-matrix second liquid crystal display device, where the first substrate has a TFT region of the first liquid crystal display device and an opposite region of the second liquid crystal display device, and the second substrate has an opposite region of the first liquid crystal display device and a TFT region of the second liquid crystal display device.

Here, a transmission type active-matrix liquid crystal display device and a reflective type active-matrix liquid crystal display device will be described.

The liquid crystal display device of a "transmission type" refers to a liquid crystal display device, of which type is to perform display by a light source (for example, a backlight or the like) of a back surface of a screen. In other words, it refers to a liquid crystal display device, when incidence of light is made from a back surface of a liquid crystal display device, of which type is to perform display on a surface opposite to the surface where the incidence is made. The same can be said for the following description.

The liquid crystal display device of a "reflective type" refers to a liquid crystal display device, of which type is to perform display by a light source (for example, an external light, a front light, or the like) of a front surface of a screen. In other words, it refers to a liquid crystal display device, when incidence of light is made from a front surface of a liquid crystal display device, of which type is to reflect light, which is reflected to a substance capable of reflecting light which is provided to the liquid crystal display device (for example, a metal electrode), to an incidence surface, and display is performed on the incidence surface. The same can be said for the following description.

The liquid crystal display device of an "active-matrix type" refers to a liquid crystal display device, of which type is to control liquid crystal display by a thin film transistor that is provided in each pixel portion. The same can be said for the following description.

In addition, another liquid crystal display device according to the present invention, which includes a first substrate and a second substrate, has a semi-transmission type active-matrix first liquid crystal display device and a reflective type active-matrix second liquid crystal display device, where the first substrate has a TFT region of the first liquid crystal display device and an opposite region of the second liquid crystal display device, and the second substrate has an opposite region of the first liquid crystal display device and a TFT region of the second liquid crystal display device.

The liquid crystal display device of a "semi-transmission type" has a function of the liquid crystal display device of a "transmission type" when incidence of light is made from a back surface of a display. On the other hand, the liquid crystal display device has a function of the liquid crystal display device of a "reflective type" when incidence of the light source is not made from the back surface of the display.

Another liquid crystal display device according to the present invention, which includes a first substrate and a second substrate, has a transmission type active-matrix first liquid crystal display device and a reflective type active-matrix second liquid crystal display device, where the first substrate has a TFT region of the first liquid crystal display device and a TFT region of the second liquid crystal display device, and the second substrate has an opposite region of the first liquid crystal display device and an opposite region of the second liquid crystal display device.

Another liquid crystal display device according to the present invention, which includes a first substrate and a second substrate, has a semi-transmission type active-matrix first liquid crystal display device and a reflective type active-matrix second liquid crystal display device, where the first substrate has a TFT region of the first liquid crystal display device and a TFT region of the second liquid crystal display device, and the second substrate has an opposite region of the first liquid crystal display device and an opposite region of the second liquid crystal display device.

In addition, the liquid crystals of the first liquid crystal display device and the liquid crystals of the second liquid crystal display device according to the present invention may be separated by a sealant.

The above structures of the liquid crystal display device and the substrate for manufacturing a liquid crystal display device can be arbitrarily combined with each other.

According to one feature of the present invention, a display device includes a first substrate where a first TFT region and a first opposite region are formed; a second substrate where a second TFT region and a second opposite region are formed; a first liquid crystal display device where the first TFT region and the second opposite region are opposed, and a second liquid crystal display device where the second TFT region and the first opposite region are opposed, where a gate electrode formed in the first TFT region, a gate electrode formed in the second TFT region, a black matrix formed in the second opposite region, and a black matrix formed in the first opposite region are formed in the same layer.

According to another feature of the present invention, a display device includes a first substrate where a first TFT region and a first opposite region are formed; a second substrate where a second TFT region and a second opposite region are formed; a first liquid crystal display device where the first TFT region and the second opposite region are opposed, and a second liquid crystal display device where the second TFT region and the first opposite region are opposed, where a wiring formed in the first TFT region, a wiring formed in the second TFT region, a black matrix formed in the second opposite region, and a black matrix formed in the first opposite region are formed in the same layer.

According to another feature of the present invention, in a display device, the gate electrode formed in the second TFT region and a reflective electrode formed in the second TFT region are formed in the same layer.

According to another feature of the present invention, in a display device, the wiring formed in the second TFT region and a reflective electrode formed in the second TFT region are formed in the same layer.

According to another feature of the present invention, in a display device, transparent electrodes formed in the first TFT region, the second TFT region, and the second opposite region are formed in the same layer.

According to another feature of the present invention, in a display device, interlayer insulating films formed in the first TFT region, the second TFT region, the first opposite region, and the second opposite region are formed in the same layer.

According to another feature of the present invention, in a display device, the first liquid crystal display device is a transmission type liquid crystal display device, and the second liquid crystal display device is a reflective or a semi-transmission type liquid crystal display device.

According to another feature of the present invention, a method for manufacturing a display device includes the steps of, in forming first and second TFT regions and first and second opposite regions over a substrate, simultaneously forming a gate electrode of the first TFT region, a gate electrode of the second TFT region, a black matrix of the second opposite region, and a black matrix of the first opposite region; forming a first substrate where the first TFT region and the second opposite region are disposed, and a second substrate where the second TFT region and the first opposite region are disposed by dividing the substrate where the first and second TFT regions and the first and second opposite regions are formed; and forming a first liquid crystal display device where the first TFT region and the first opposite region are opposed, and a second liquid crystal display device where the second TFT region and the second opposite region are opposed by attaching the first substrate and the second substrate to be opposed.

According to another feature of the present invention, a method for manufacturing a display device includes the steps of, in forming first and second TFT regions and first and second opposite region over a substrate, simultaneously forming a wiring of the first TFT region, a wiring of the second TFT region, a black matrix of the second opposite region, and a black matrix of the first opposite region; forming a first substrate where the first TFT region and the second opposite region are disposed, and a second substrate where the second TFT region and the first opposite region are disposed by dividing the substrate where the first and second TFT regions and the first and second opposite regions are formed; and forming a first liquid crystal display device where the first TFT region and the first opposite region are opposed, and a second liquid crystal display device where the second TFT region and the second opposite region are opposed by attaching the first substrate and the second substrate to be opposed.

According to another feature of the present invention, in a method for manufacturing a display device, in forming the first and second TFT regions and the first and second opposite regions over the substrate, the gate electrode of the second TFT region and a reflective electrode of the second TFT region are formed simultaneously.

According to another feature of the present invention, in a method for manufacturing a display device, in forming the first and second TFT regions and the first and second opposite regions over the substrate, the wiring of the second TFT region and a reflective electrode of the second TFT region are formed simultaneously.

According to another feature of the present invention, in a method for manufacturing a display device, in forming the first and second TFT regions and the first and second opposite regions over the substrate, transparent electrodes of the first TFT region, the second TFT region, and the second opposite region are formed simultaneously.

According to another feature of the present invention, in a method for manufacturing a display device, in forming the first and second TFT regions and the first and second opposite regions over the substrate, interlayer insulating films of the first TFT region, the second TFT region, the first opposite region, and the second opposite region are formed simultaneously.

According to the structures of the present invention, a thin liquid crystal display device capable of double-sided display with low power consumption can be provided.

In addition, according to the structures of the present invention, the number of substrates that are used in manufacturing a liquid crystal display device can be reduced. Consequently, the yield can be improved and the cost can be reduced.

Moreover, according to the structures of the present invention, an opposite region can be formed simultaneously with forming a TFT region by using the same material for part of the manufacturing material of the opposite region and part of the manufacturing material of the TFT region. Therefore, the number of device processing times and materials that are used can be reduced. Consequently, the yield can be improved and the cost can be reduced.

BRIEF DESCRIPTION OF DRAWINGS

FIG. 7 is a view of a substrate for manufacturing a liquid crystal display device manufactured over a large-sized substrate;

FIGS. 9A to 9D are each a method for manufacturing a bottom-gate TFT and an opposite region (a cross-sectional view);

FIGS. 10A to 10D are each a method for manufacturing a bottom-gate TFT and an opposite region (a cross-sectional view);

FIGS. 11A to 11D are each a method for manufacturing a bottom-gate TFT and an opposite region (a cross-sectional view);

FIGS. 12A to 12D are each a method for manufacturing a bottom-gate TFT and an opposite region (a cross-sectional view);

DETAILED DESCRIPTION OF THE INVENTION

Hereinafter, an embodiment mode will be shown. Note that the following embodiment mode can be implemented by being appropriately combined.

Embodiment Mode 1

This embodiment mode will explain an example of a method for assembling an active-matrix substrate having two TFT regions and two opposite regions into a liquid crystal display panel capable of double-sided display.

First, a structure of a substrate will be explained.

Figure 1A:
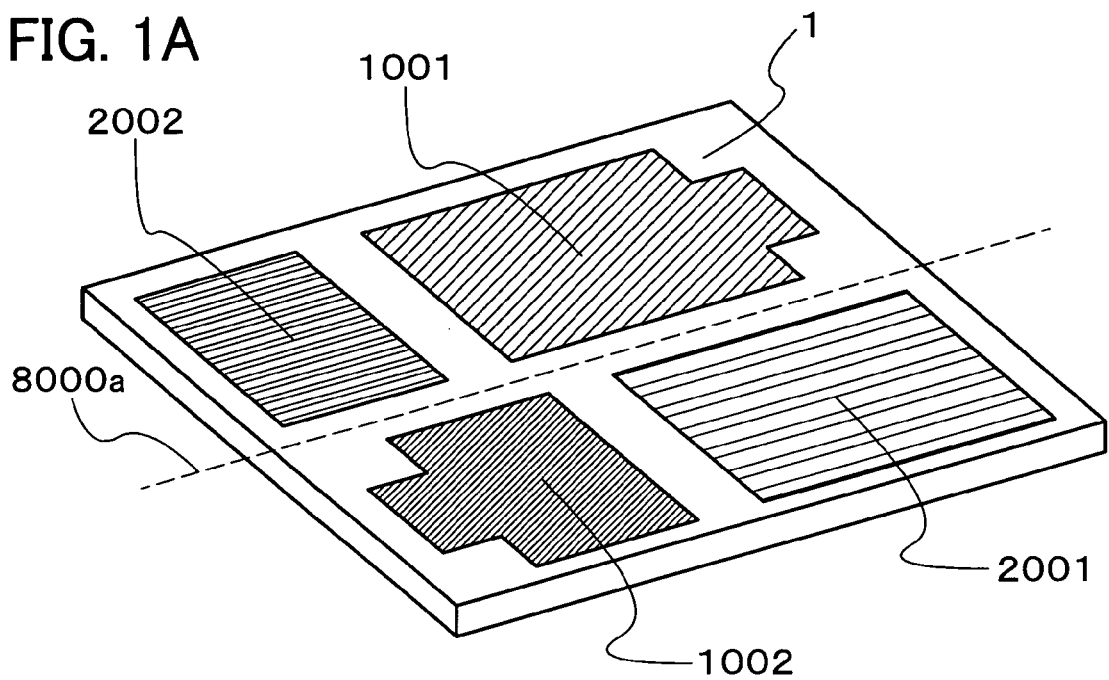
FIGS. 1A and 1B are each a method for assembling a liquid crystal display device.

A substrate having the following structure is manufactured: over a substrate 1, a first TFT region 1001, a second TFT region 1002, a first opposite region 2001, and a second opposite region 2002 are disposed so that the first TFT region 1001 and the second opposite region 2002 are disposed adjacently, and the second TFT region 1002 and the first opposite region 2001 are disposed adjacently (see FIG. 1A).

As the substrate 1, a substrate made of glass such as barium borosilicate glass or alumino borosilicate glass, quartz, a silicon wafer, or the like can be used. These materials can be appropriately selected depending on intended use of a semiconductor device or a process condition such as temperature.

If the substrate 1 can withstand a processing temperature, a substrate made of a plastic material having high heat resistance, for example, polycarbonate, polyimide, or an acrylic material can also be used. In addition, the shape of the substrate 1 has either a flat surface or a curved surface, or both, and a substrate having a shape of a flat plate, a stripe, or an elongated shape is appropriately selected depending on a process or a manufacturing apparatus.

Each of the TFT regions includes at least a TFT, a pixel electrode, a wiring for electrically connecting each TFT depending on a configuration of an electric circuit or a function of a liquid crystal display device, and a wiring for connecting an external input terminal (an FPC or the like) and an electric circuit portion. In addition, if necessary, an interlayer insulating film, a reflective electrode, or the like is included. Moreover, an element such as a capacitor element or a resistive element may be disposed if necessary in terms of the configuration of the electric circuit.

The TFT, the element such as a capacitor element or a resistive element, the pixel electrode, and the reflective electrode are electrically connected to each other through the wiring depending on the electric circuit configuration.

Note that the interlayer insulating film is to prevent short between conductors such as a gate electrode, a wiring, or the like. In addition, with the use of a material capable of planarizing (for example, acrylic, polyimide, siloxane, or the like), there is an effect of planarizing a depression and a projection over the substrate (since a TFT is manufactured by repeating a film formation; transferring a mask pattern by a lithography method; and an etching step, a depression and a projection are much generated as steps proceed).

Here, the "planarization" refers to that, when there is a depression and a projection over the substrate, deposition over the projection is performed to obtain a thin film thickness, and deposition over the depression is performed to obtain a thick film thickness; therefore, difference in step is reduced. The same can be said for the following description.

In addition, it is not always necessary to electrically connect the reflective electrode as long as external light can be reflected.

The TFT has at least a gate electrode, a gate insulating film, and an island-shaped semiconductor layer, and the island-shaped semiconductor layer has at least a source region, a drain region, and a channel formation region. If necessary, a low-concentration impurity region (i.e. Lightly-Doped-Drain region, hereinafter, an LDD region) may be provided either between the channel formation region and the source region or between the channel formation region and the drain region, or both.

It is possible to manufacture the above capacitor element or resistor by using a material for forming the gate electrode, the island-shaped semiconductor layer, the wiring, the interlayer insulating film, the reflective electrode, or the like.

Each of the opposite regions has at least an opposite electrode. In addition, if necessary, a color filter, a black matrix, a planarizing insulating layer, a reflective electrode, or the like are included. These can be appropriately chosen depending on a structure of a liquid crystal display device.

Note that the color filter is to color a display image of a liquid crystal display device, and there are three types of RGB (red, green, and blue).

In addition, the opposite electrodes are each formed in the opposite region, which is made to serve to apply a voltage to liquid crystals.

Moreover, a "planarizing insulating film" (or an "overcoat film" or an "interlayer insulating film") refers to a film for planarizing a depression and a projection that are generated by forming, for example, the black matrix or the color filter in the opposite region before forming the opposite electrode.

It is possible to manufacture the above black matrix, opposite electrode, planarizing insulating layer, reflective electrode, or the like by using a material for forming the gate electrode, the wiring, the interlayer insulating film, the reflective electrode, or the like that forms the TFT.

For example, it is possible to form the black matrix by using the same material as the gate electrode or the wiring that forms the TFT. In other words, the black matrix in the opposite region can be manufactured simultaneously with manufacturing the gate electrode and the wiring of the TFT.

Further, in the same manner, it is possible to form the opposite electrode by using the same material as the pixel electrode, the gate electrode, and the wiring. In other words, the opposite electrode in the opposite region can be manufactured simultaneously with manufacturing the pixel electrode, the gate electrode, and the wiring of the TFT.

Furthermore, in the same manner, it is possible to form the planarizing insulating layer by using the same material as the interlayer insulating film, for which a material capable of planarizing is used. In other words, the planarizing insulating layer of the opposite region can be manufactured simultaneously with manufacturing the interlayer insulating film of the TFT.

In such a manner, the composition material of the opposite region can be formed simultaneously with forming one of the composition materials of the TFT by using the same material as the composition material of the TFT for the material of the opposite region. Therefore, the number of device processing times and the material that is used for manufacturing the opposite region can be reduced. Consequently, the yield can be improved and the cost can be reduced.

Next, a procedure for assembling a liquid crystal display device capable of double-sided display from the substrate having the above structure will be explained.

Figure 1B:
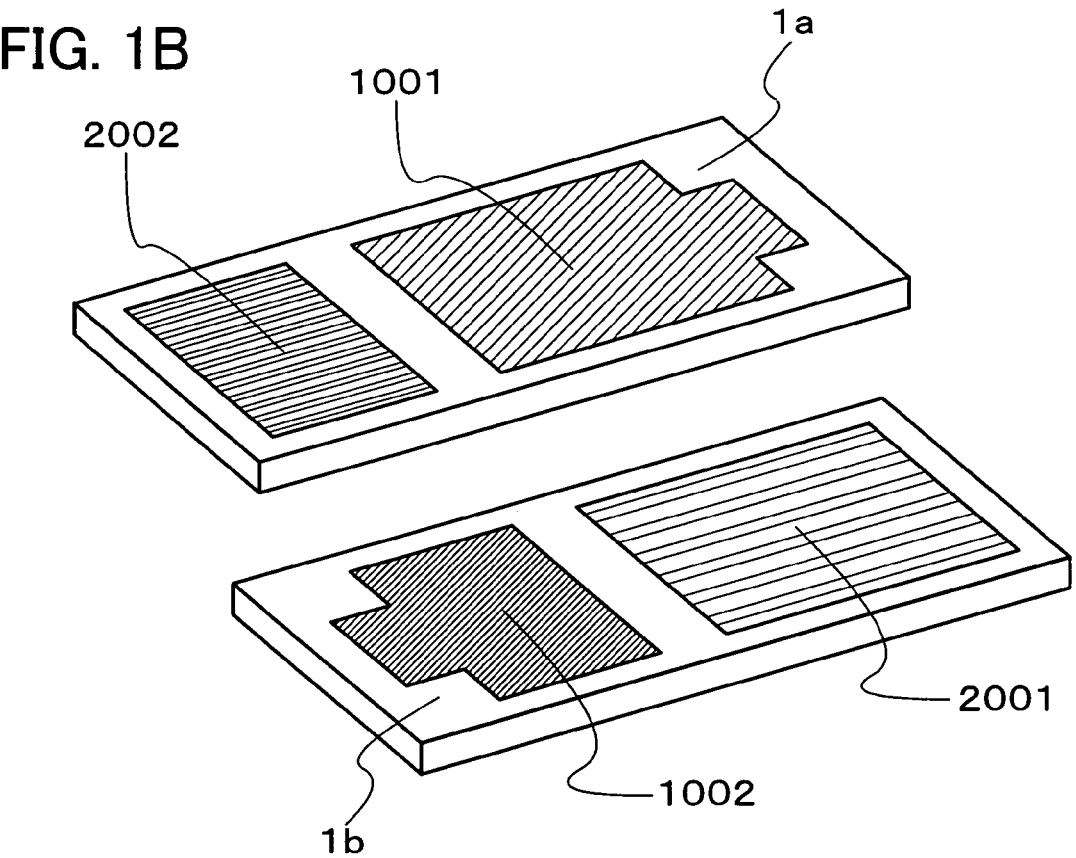

The substrate 1 is divided into a first substrate 1a having the first TFT region 1001 and the second opposite region 2002 and a second substrate 1b having the second TFT region 1002 and the first opposite region 2001 (see FIGS. 1A and 1B; the divided place is shown by a first broken line 8000a of FIG. 1A).

Figure 2A:
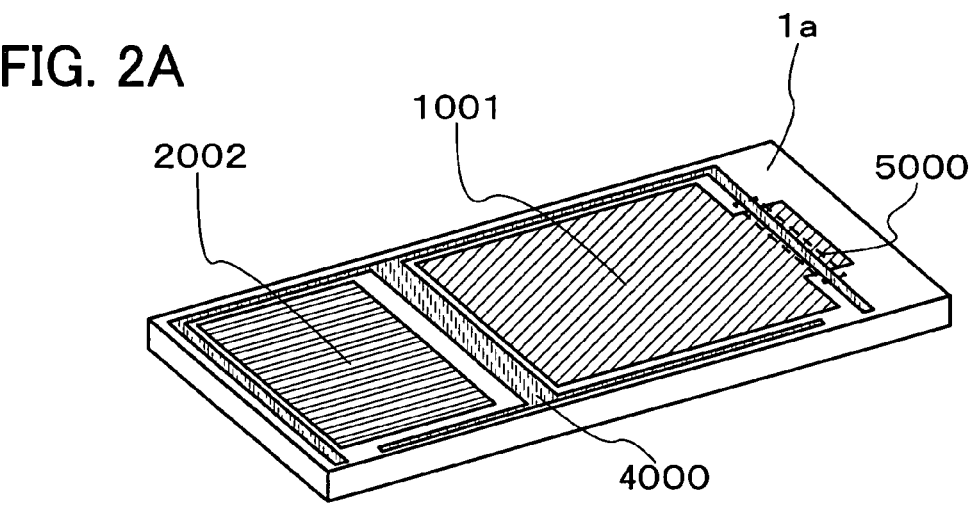
FIGS. 2A and 2B are each a method for assembling a liquid crystal display device.

Then, an alignment film is formed to the first substrate 1a and the second substrate 1b, spacer is dispersed, and a sealant 4000 is formed in a portion where a TFT in the first TFT region 1001 and a TFT in the second opposite region 2002 of the first substrate 1a are not disposed (see FIG. 2A).

Figure 2B:
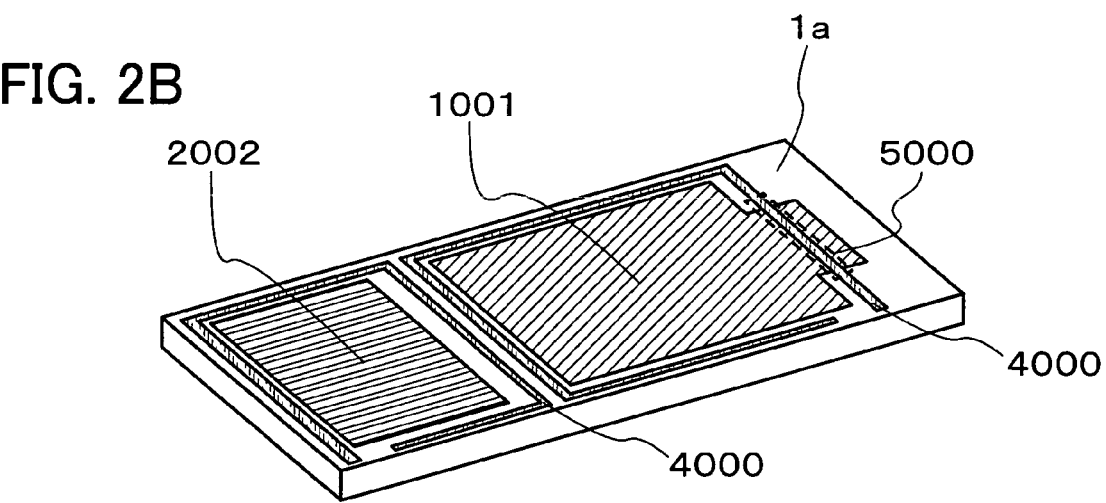

Note that a wiring is formed in a superposed region 5000 where the sealant 4000 is formed in part of the first TFT region 1001 (see FIGS. 2A and 2B).

However, in order to form an inlet of liquid crystals, the sealant 4000 is not formed in part of the vicinity of the first TFT region 1001 and the second opposite region 2002 of the first substrate 1a (see FIGS. 2A and 2B).

In addition, the sealant 4000 is formed so that the first TFT region 1001 is separated from the second opposite region 2002 (see FIGS. 2A and 2B).

Therefore, for example, the sealant may be formed in the entire region between the first TFT region 1001 and the second opposite region 2002 (see FIG. 2A).

In addition, there may be a space partitioned by the sealant 4000 in the region between the first TFT region 1001 and the second opposite region 2002 (see FIG. 2B).

Note that, in this embodiment mode, the sealant 4000 is formed in the substrate 1a; however, the sealant 4000 may be formed to the second substrate 1b. Accordingly, where the sealant is formed can be appropriately selected.

Figure 3A:
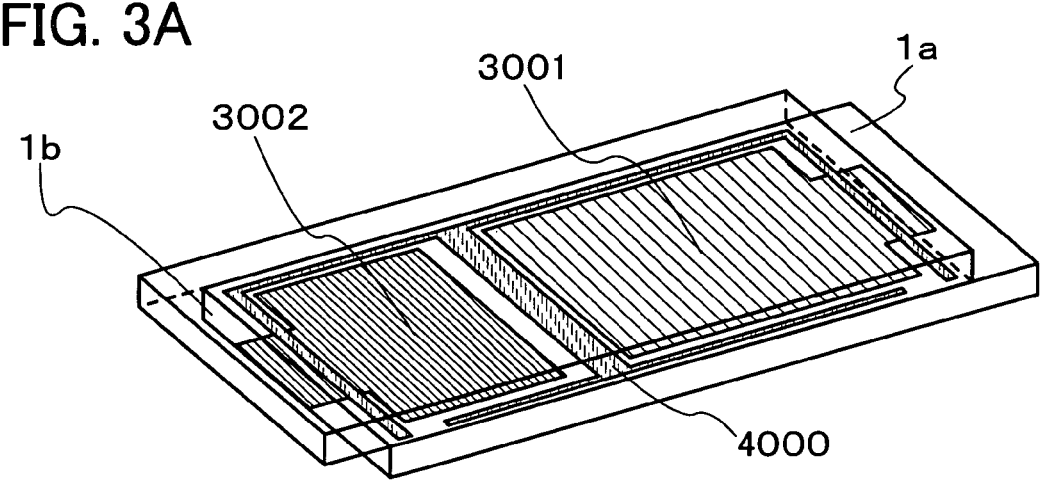
FIGS. 3A and 3B are each a method for assembling a liquid crystal display device.

Next, the first substrate 1a and the second substrate 1b are attached so that the first opposite region 2001 is disposed on the opposite side of the first TFT region 1001, and the second opposite region 2002 is disposed on the opposite side of the second TFT region 1002. Then, the sealant 4000 is cured (see FIG. 3A).

Figure 3B:
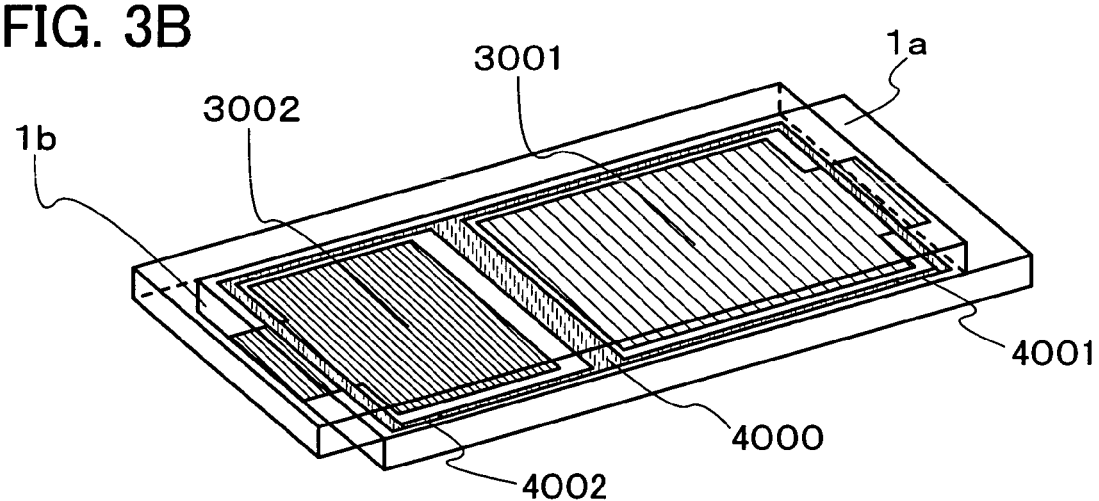

Then, after injecting liquid crystals from the inlet, the liquid crystal inlet is sealed with a first sealing region 4001 and a second sealing region 4002 (see FIG. 3B).

Note that, by partitioning the region between the first TFT region 1001 and the second opposite region 2002 with the sealant 4000, it is possible to shield light of a backlight that is used for a first liquid crystal display region 3001. Accordingly, the display of a second liquid crystal display region 3002 can be less affected.

In addition, by having the above structure of the sealant 4000, the display of the second liquid crystal display region 3002 is not affected by a voltage applied to the first TFT region 1001, and the display of the first liquid crystal display region 3001 is not affected by a voltage applied to the second TFT region 1002.

Figure 35:
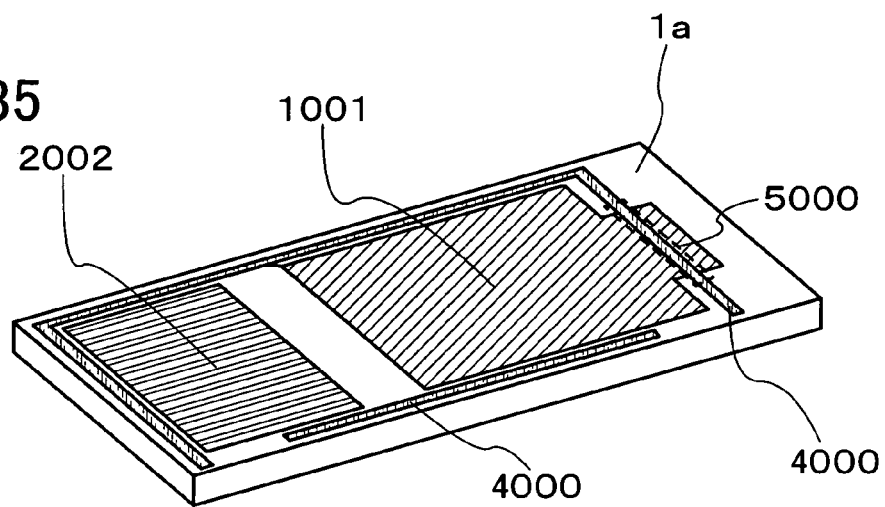
FIG. 35 is a method for assembling a liquid crystal display device.

Note that, in this embodiment mode, the liquid crystal display regions are separated with the sealant in order to obtain the above effect; however, it is not always necessarily to separate the liquid crystal display regions (see FIG. 35).

Next, a polarizing plate is attached.

Figure 4A:
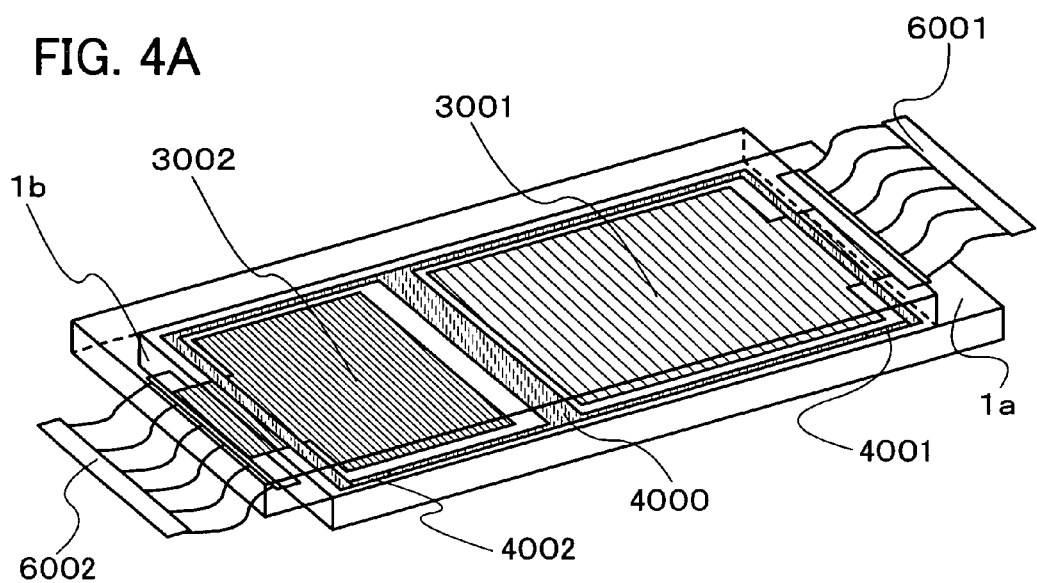
FIGS. 4A and 4B are a method for assembling a liquid crystal display device and a cellular phone using the liquid crystal display device.

Then, a first FPC 6001 and a second FPC 6002 are attached (FIG. 4A).

Note that the FPC is an abbreviation of Flexible Printed Circuit, and the same abbreviation is used below.

In addition, the liquid crystal display region including the first TFT region 1001 and the first opposite region 2001 is regarded as the first liquid crystal display region 3001, and the liquid crystal display region including the second TFT region 1002 and the second opposite region 2002 is regarded as the second liquid crystal display region 3002 (see FIG. 4A).

Moreover, the first liquid crystal display region 3001 is a transmission or semi-transmission type liquid crystal display device, and the second liquid crystal display region 3002 is a reflective type liquid crystal display device.

Therefore, bright and clear display can be obtained in the first liquid crystal display region 3001 by using a backlight or the like, and low power consumption can be realized in the second liquid crystal display region 3002 without necessity of providing a backlight (the backlight is provided on the substrate side where the first TFT region 1001 of the first liquid crystal display region 3001 is disposed).

Note that a front light may be provided on the substrate side where the second TFT region 1002 of the second liquid crystal display region 3002 is disposed.

Further, separate display signals can be transmitted by providing the first FPC 6001 and the second FPC 6002. Therefore, for example, the following operation can be made, which enables reduction of the power consumption: when the first liquid crystal display region 3001 which becomes a main panel is displayed, the power supply of the second liquid crystal display region 3002 which becomes a sub-panel is turned off, and, when the second liquid crystal display region 3002 which becomes a sub-panel is displayed, the power supply of the first liquid crystal display region 3001 which becomes a main panel is turned off.

In such a manner, a liquid crystal display device capable of double-sided display can be obtained (see FIG. 4A).

Figure 4B:
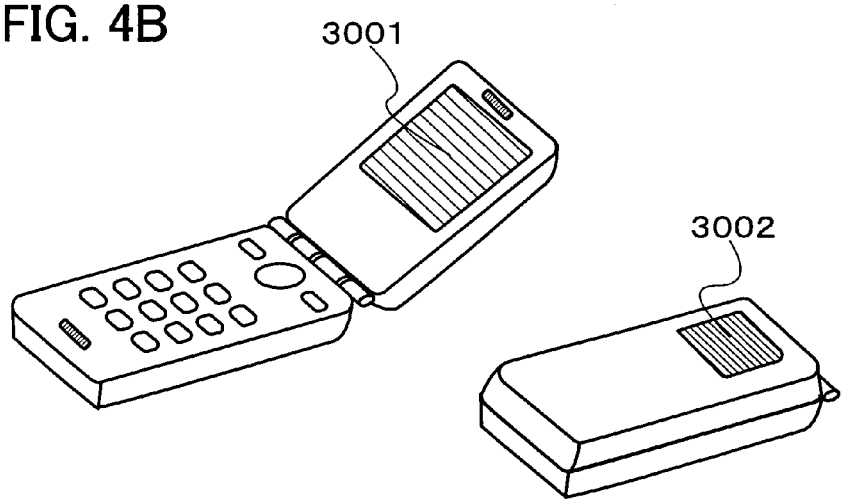

A cellular phone installed with the liquid crystal display device is shown (see FIG. 4B).

Figure 36:
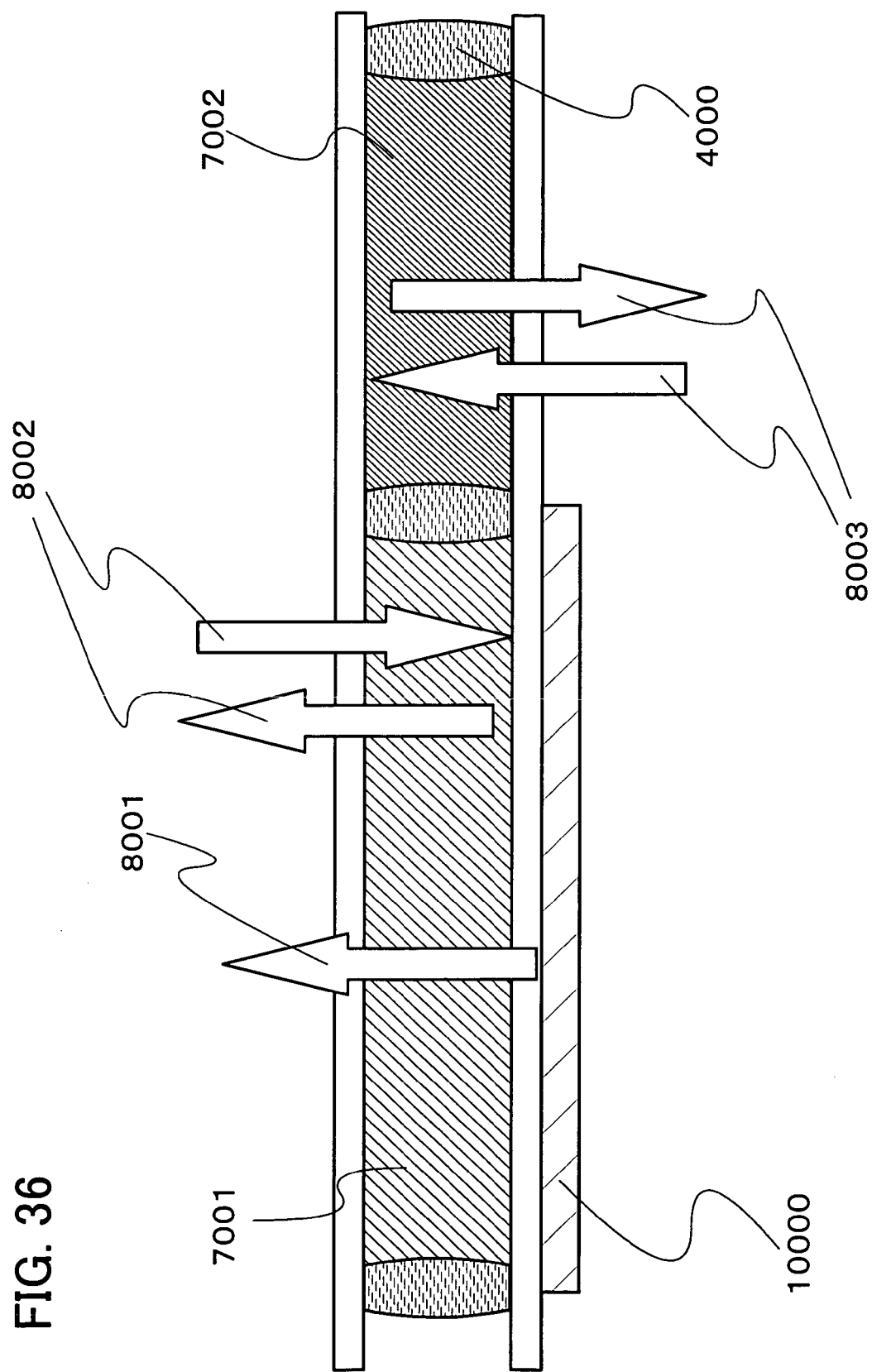
FIG. 36 shows a cross-sectional view of a liquid crystal display device.

FIG. 36 shows a cross-sectional view of a liquid crystal display device manufactured using the above method.

A first liquid crystal display device 7001 is a transmission or semi-transmission type liquid crystal display device. Light 8001 from a backlight 10000 is transmitted through the first liquid crystal display region 3001. In addition, when the backlight does not emit light, external light 8002 is reflected within the first liquid crystal display region 3001. Therefore, the display surface of the first liquid crystal display region 3001 is the opposite side of the surface where the backlight 10000 is disposed.

In addition, a second liquid crystal display device 7002 is a reflective type liquid crystal display device. External light 8003 is reflected within the second liquid crystal display region 3002. Therefore, the display surface of the second liquid crystal display region 3002 is the side of the surface where the backlight 10000 is disposed.

The external light 8002 and 8003 are natural light. In addition, incidence of light may be performed by using a backlight or an optical waveguide. Note that, when the external light 8003 is natural light, a backlight is not necessary besides the backlight 10000. Therefore, the liquid crystal display device can be thinned.

According to the structure of this embodiment mode, a thin liquid crystal display device capable of double-sided display can be manufactured and an opposite region can be simultaneously manufactured over one substrate; therefore, the substrates that are used in manufacturing a liquid crystal display panel can be reduced. Consequently, the yield can be improved and the cost can be reduced.

Embodiment Mode 2

In Embodiment Mode 1, over the substrate 1, the first TFT region 1001, the second TFT region 1002, the first opposite region 2001, and the second opposite region 2002 are disposed so that the first TFT region 1001 and the second opposite region 2002 are disposed adjacently with each other, and the second TFT region 1002 and the first opposite region 2001 are disposed adjacently with each other (see FIG. 1A).

Figure 5A:
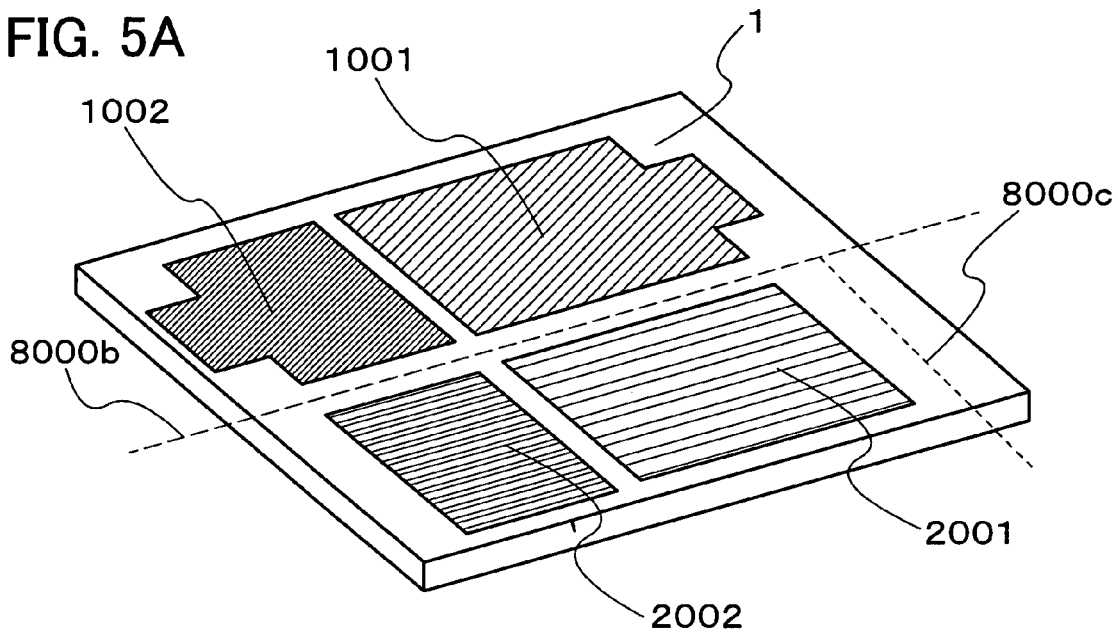
FIGS. 5A and 5B are each a method for assembling a liquid crystal display device.

In this embodiment mode, a substrate having the following structure is manufactured: over a substrate 1, a first TFT region 1001, a second TFT region 1002, a first opposite region 2001, and a second opposite region 2002 are disposed so that the first TFT region 1001 and the second TFT region 1002 are disposed adjacently, and the second opposite region 2002 and the first opposite region 2001 are disposed adjacently (see FIG. 5A).

Also in a case of this embodiment mode, as with Embodiment Mode 1, the composition material of the opposite region can be formed simultaneously with forming one of the composition materials of the TFT by using the same material as the composition material of the TFT for the material of the opposite region. Therefore, the number of device processing times and the materials that are used for manufacturing the opposite region can be reduced. Consequently, the duration of a process and the cost can be reduced.

Also in a case of this embodiment mode, as described in Embodiment Mode 1, it is possible to manufacture a black matrix of the opposite region simultaneously with manufacturing a gate electrode or a wiring of a TFT by using the same material as the gate electrode or the wiring that forms the TFT.

In the same manner, an opposite electrode in the opposite region can be manufactured simultaneously with manufacturing a pixel electrode, the gate electrode, or the wiring of the TFT by using the same material as the pixel electrode, the gate electrode, or the wiring.

In the same manner, it is possible to form a planarizing insulating layer by using the same material as an interlayer insulating film, for which a material capable of planarizing is use In other words, the planarizing insulating layer of the opposite region can be manufactured simultaneously with manufacturing the interlayer insulating film of the TFT.

In addition, in the case of this embodiment mode, by using a color filter and a black organic film for the interlayer insulating film of the TFT region, the necessity of using the planarizing insulating layer and the black matrix of the opposite region can be removed.

In other words, any color of RGB is allocated for one pixel; therefore, the interlayer insulating film disposed below the pixel electrode is disposed as color filters, of which colors are each allocated, and the black organic film is disposed as the interlayer insulating film other than below the pixel electrode so as to serve as a black matrix. Therefore, only the opposite electrode may be formed in the opposite region.

Accordingly, in the opposite region, there is no necessity of forming the planarizing insulating film because an opposite electrode is formed over a plane substrate.

Therefore, the number of device processing times and the materials that are used for manufacturing the opposite region can be reduced. Consequently, the yield can be improved and the cost can be reduced.

In addition, materials that are used are increased by one by newly employing the black matrix for the interlayer insulating film of the TFT. Therefore, a color filter of any of RGB may be used for the interlayer insulating film other than below the pixel electrode. Also in this case, the number of device processing times and the materials that are used for manufacturing the opposite region can be reduced. Consequently, the duration of a process and the cost can be reduced.

Figure 5B:
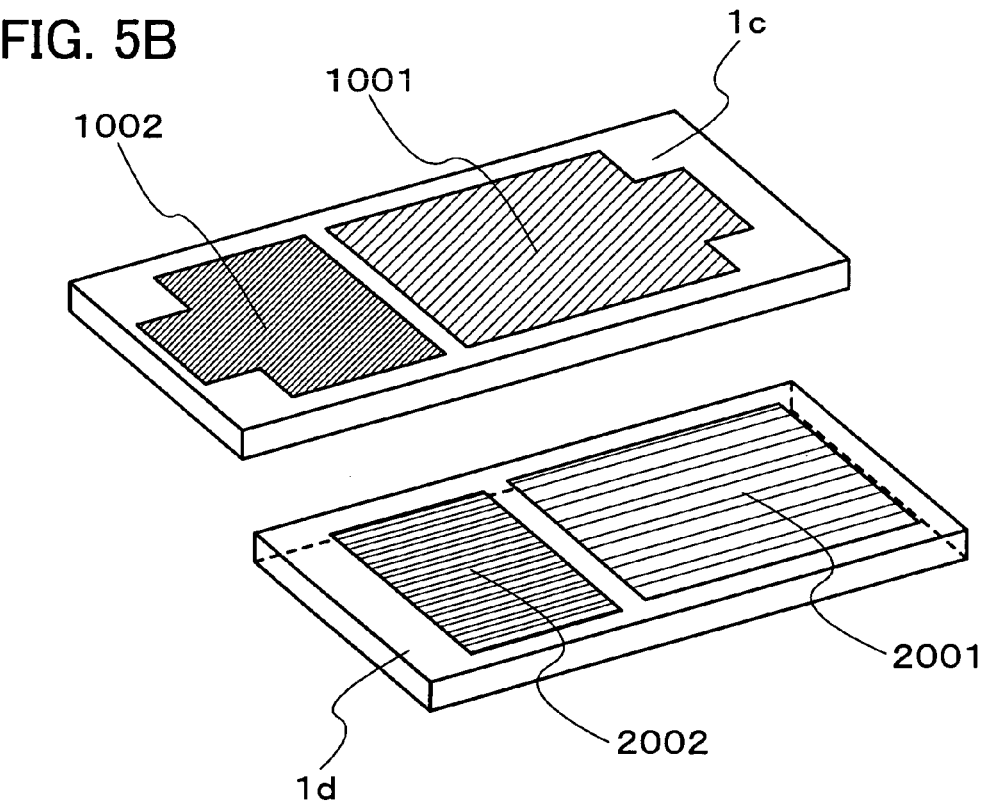

In the case of the structure of this embodiment mode, the substrate 1 is divided into a third substrate 1c having the first TFT region 1001 and the second TFT region 1002 and a fourth substrate 1d having the first opposite region 2001 and the second opposite region 2002. In addition, the fourth substrate 1d is cut short so that a region, where the first TFT region 1001 and the second TFT region 1002 are each connected to an FPC, is exposed (see FIGS. 5A and 5B; the divided place is shown by a second broken line 8000b and a third broken line 8000c of FIG. 5A).

Figure 6A:
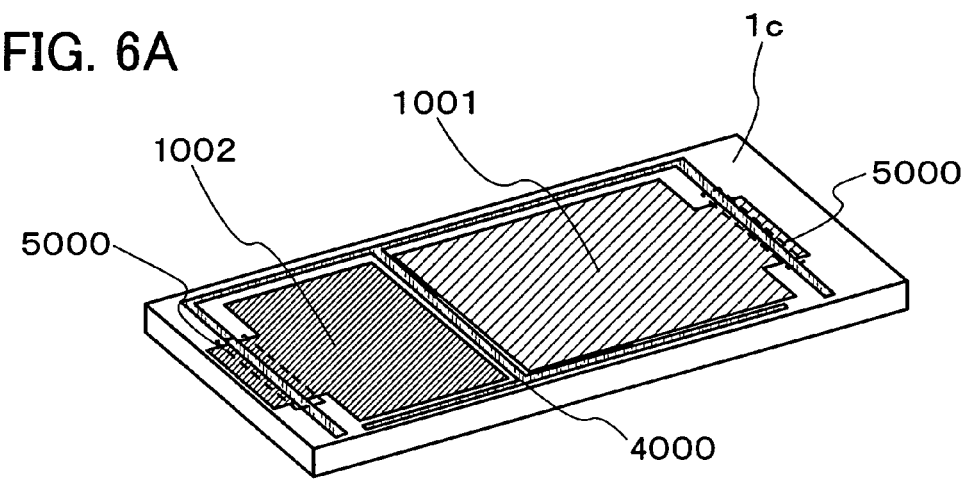
FIGS. 6A and 6B are each a method for assembling a liquid crystal display device.

Next, a sealant is formed on the third substrate 1c. As with Embodiment Mode 1, a sealant 4000 is formed so that the first TFT region 1001 and the second TFT region 1002 are completely separated (see FIG. 6A).

Figure 6B:
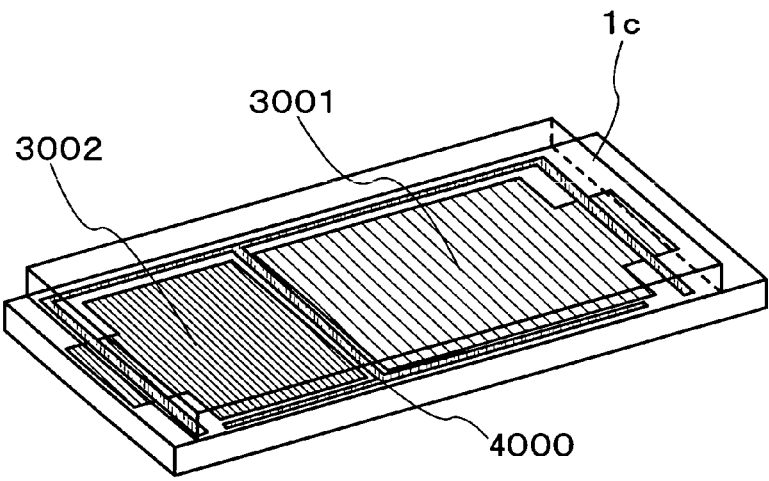

The third substrate 1c and the fourth substrate 1d are attached so that the first opposite region 2001 is disposed on the opposite side of the first TFT region 1001, and the second opposite region 2002 is disposed on the opposite side of the second TFT region 1002 (see FIG. 6B).

Then, as with Embodiment Mode 1, a liquid crystal display panel is assembled by attaching an FPC, a polarizing plate, and a backlight to manufacture, for example, a cellular phone.

Also in this embodiment mode, a thin liquid crystal display device capable of double-sided display can be manufactured and the number of substrates that are used in manufacturing a liquid crystal display panel is only one. Consequently, the yield can be improved and the cost can be reduced.

Embodiment Mode 3

Embodiment Modes 1 and 2 each exemplify the mode where the four regions (the first TFT region 1001, the second TFT region 1002, the first opposite region 2001, and the second opposite region 2002) which are minimum requirements of a liquid crystal display device capable of double-sided display are formed in one substrate.

This embodiment mode will explain an example of manufacturing a plurality of TFT regions and opposite regions.

The four regions, which are minimum requirements of a liquid crystal display device capable of double-sided display, are arranged in a matrix to manufacture TFT regions and opposite regions (see FIG. 7; reference numerals are partially omitted in FIG. 7).

Figure 8A:
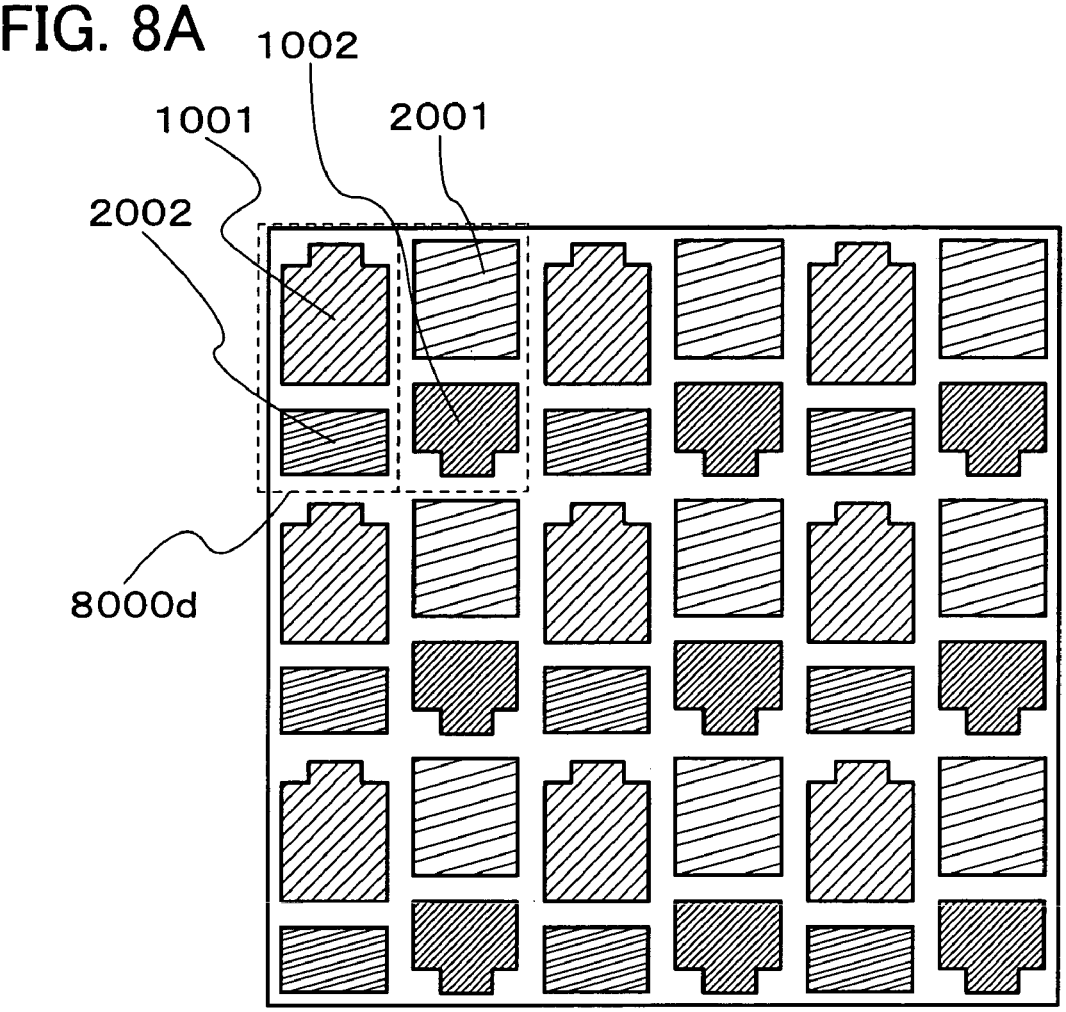
FIGS. 8A and 8B are a view of a substrate for manufacturing a liquid crystal display device manufactured over a large-sized substrate and an example of dividing the substrate.
Figure 8B:
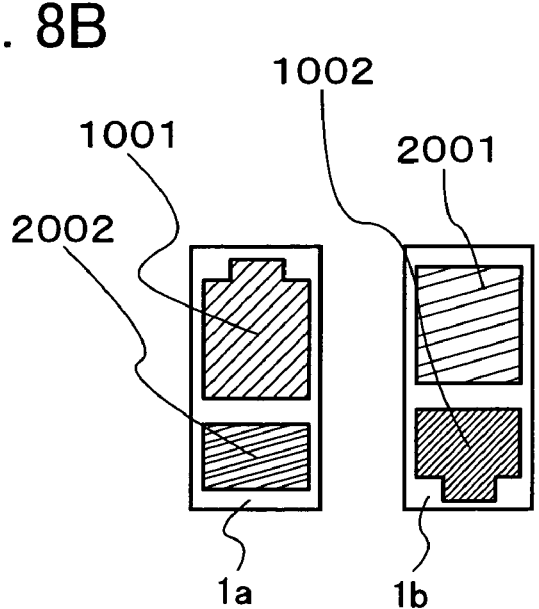

After completing the TFT regions and the opposite regions, a substrate is appropriately divided. Consequently, it is possible to manufacture a liquid crystal display device capable of double-sided display by applying the methods of Embodiment Modes 1 and 2 (see FIGS. 8A and 8B; the substrate is divided along a fourth broken line 8000d).

In addition to the effects of Embodiment Mode 1 and 2, it is possible to manufacture a plurality of liquid crystal display devices from a large-sized substrate by employing this embodiment mode.

As a plurality of the liquid crystal display devices can be manufactured from the large-sized substrate, this implies that the total number of device processing times in the case of manufacturing the same amounts of the liquid crystal display devices can be reduced, which results in decrease of the cost.

Embodiment Mode 4

A typical manufacturing method of an electric circuit, such as an active-matrix liquid crystal display device, where an element such as a TFT, a capacitor element, or a resistive element are disposed, includes the steps of performing film formation and forming a mask pattern by a mask pattern transferring technique, which are repeated, to manufacture a circuit simultaneously with manufacturing a desired element.

This embodiment mode will explain an example of a method for manufacturing, over one substrate, the first TFT region 1001 and the first opposite region 2001 of the transmission or semi-transmission type liquid crystal display device, and the second TFT region 1002 and the second opposite region 2002 of the reflective type liquid crystal display device in Embodiment Mode 1, by the above typical manufacturing method.

This embodiment mode will explain an example of a typical method for manufacturing reverse stagger TFTs for TFTs of a first TFT region 1001 and a second TFT region 1002.

Note that, in the drawings used for explaining this embodiment mode, for convenience, the explanation is made showing, in the drawings, one of the TFTs of the first TFT region 1001, one of the TFTs of the second TFT region 1002, one of color filters of a first opposite region 2001, and one of color filters of a second opposite region 2002 (a red color filter region). Each TFT region has a plurality of TFTs, an element, which is necessary, a wiring, or the like; and each opposite region has a green color filter region, a blue color filter region, and the like.

Further, in the drawings used for explaining this embodiment mode, for convenience, the four regions (the first TFT region 1001, the second TFT region 1002, the first opposite region 2001, and the second opposite region 2002) are shown in the drawings by being surrounded with a chain line.

In addition, the present invention can be implemented with various modes. Moreover, it is to be easily understood to those skilled in the art that various changes and modifications will be apparent. Therefore, unless such changes and modifications depart from the purport and the scope of the present invention, they should be construed as being included therein.

Note that the same portions or portions having the same function in all drawings for explaining embodiment modes are denoted by the same reference numerals and repeated explanations thereof will be omitted.

First, a substrate 100 is prepared (see FIG. 9A).

As the substrate 100, a substrate made of glass such as barium borosilicate glass or alumino borosilicate glass, quartz, a silicon wafer, or the like can be used. These materials can be appropriately selected depending on intended use of a semiconductor device or a process condition such as temperature.

If the substrate 100 can withstand a processing temperature, a substrate made of a plastic material having high heat resistance, for example, polycarbonate, polyimide, or an acrylic material can also be used. In addition, the shape of the substrate 100 has either a flat surface or a curved surface, or both, and a substrate having a shape of a flat plate, a stripe, or an elongated shape is appropriately selected depending on a process or a manufacturing apparatus.

Next, a first conductive film 200 is formed over the substrate 100 (see FIG. 9B).

Then, the first conductive film 200 is etched after transferring mask patterns thereto by a lithography method. Accordingly, a first gate electrode 201a and a first gate wiring 202a are formed in the first TFT region 1001, a second gate electrode 201b and a second gate wiring 202b are formed in the second TFT region 1002, first black matrixes 203a are formed in the first opposite region 2001, and second black matrixes 203b are formed in the second opposite region 2002. Thereafter, the transferred resist masks are removed (see FIG. 9C).

Note that the first gate wiring 202a and the first gate electrode 201a, which are not shown in the drawing, are electrically connected.

In the same manner, the second gate wiring 202b and the second gate electrode 201b, which are not shown in the drawing, are electrically connected.

The first conductive film 200 is a conductive film formed of a conductive material by a sputtering method or the like, which is a material containing a conductive material or a semiconductor material as its main component.

For example, Mo (molybdenum) is formed to have a film thickness of 300 nm. Besides Mo (molybdenum), the first conductive film can be formed using any material without particular limitation as long as the structure thereof contains at least one layer of the following: a metal material such as Ta (tantalum), Ti (titanium), W (tungsten), or chromium (Cr); silicide which is a compound of these metal materials and silicon; a material such as polysilicon having N-type or P-type conductivity; and a material containing a low resistance, metal material such as Cu (copper) or Al (aluminum) as its main component.

Note that, since the first conductive film 200 is etched after transferring the mask pattern thereto by a lithography method, the first gate electrode 201a, the second gate electrode 201b, the first gate wiring 202a, the second gate wiring 202b, the first black matrixes 203a, and the second black matrixes 203b are formed of the same material as the first conductive film 200.

By simultaneously manufacturing the black matrixes and the gate electrodes over the substrate surface by using the same material, the number of the masks, the number of device processing times, and the materials that are used can be reduced. Consequently, the yield can be improved and the cost can be reduced.

Next, a gate insulating film 103 is formed, and a first semiconductor film 102 is formed over the gate insulating film 103 (see FIG. 9D).

The gate insulating film 103 is an insulating material which is formed using a CVD method, a sputtering method, or the like, for example, an insulating material containing silicon as its main component.

For example, a silicon nitride film is formed to have a film thickness of 300 nm. As the gate insulating film 103, other insulating film containing silicon may be used in a single layer or stacked layer structure.

The first semiconductor film 102 is a semiconductor material which is formed using a CVD method, a sputtering method, or the like.

For example, an amorphous silicon film is formed to have a film thickness of 150 nm. The material of the first semiconductor film 102 is not limited to silicon and other semiconductor materials can be appropriately selected.

In addition, it is preferable to continuously form the gate insulating film 103 and the first semiconductor film 102 within a vacuum atmosphere. This is because continuously forming the films within a vacuum atmosphere prevents the interface of the gate insulating film from being contaminated from an atmosphere, which results in decrease of defects in the interface of the gate insulating film.

Moreover, in order to enhance crystallinity of the first semiconductor film 102, the crystallization may be performed with energy added by laser light irradiation, furnace annealing, RTA (Rapid Thermal Annealing), or the like.

An impurity ion may be introduced into the first semiconductor film 102 by doping or the like in order to control a threshold voltage of the TFT to be manufactured here.

Next, a first impurity semiconductor film 104 is formed over the first semiconductor film 102 (see FIG. 10A).

The first impurity semiconductor film is a semiconductor film containing a donor-type element which is formed by a CVD method or the like.

For example, a silicon film containing phosphorus (P) is formed to have a film thickness of 50 nm.

Note that, in this embodiment mode, the silicon film containing phosphorus (P) is used for the first impurity semiconductor film 104 in order to manufacture an n-channel TFT; however, in a case of manufacturing a p-channel TFT, a semiconductor film containing an acceptor-type element such as boron (B) is formed.

Then, the stacked first impurity semiconductor film 104 and first semiconductor film 102 are etched after transferring mask patterns thereto by a lithography method. Accordingly, a first island-shaped impurity semiconductor layer 104a and a first island-shaped semiconductor layer 102a are formed in the first TFT region 1001, and a second island-shaped impurity semiconductor layer 104b and a second island-shaped semiconductor layer 102b are formed in the second TFT region 1002. Thereafter, the transferred resist masks are removed (see FIG. 10B).

Next, the gate insulating film 103 is etched after transferring mask patterns thereto by a lithography method. Accordingly, a first contact region 900a is formed by exposing part of the first gate wiring 202a, and a second contact region 900b is formed by exposing part of the second gate wiring 202b. Thereafter, the transferred resist masks are removed.

Then, a second conductive film 400 is formed (see FIG. 10C).

The second conductive film 400 is a conductive film formed of a conductive material by a sputtering method or the like, which is a material containing a conductive material or a semiconductor material as its main component.

For example, Mo (molybdenum) is formed to have a film thickness of 300 nm. Besides Mo (molybdenum), the second conductive film can be formed using any material without particular limitation as long as the structure thereof contains at least one layer of the following: a metal material such as Ta (tantalum), Ti (titanium), W (tungsten), or chromium (Cr); silicide which is a compound of these metal materials and silicon; a material such as polysilicon having N-type or P-type conductivity; and a material containing a low resistance metal material such as Cu (copper) or Al (aluminum) as its main component.

Next, the second conductive film 400 is etched after transferring mask patterns thereto by a lithography method. Accordingly, a first wiring 401a and a second wiring 401b are formed in the first TFT region 1001, and a third wiring 401c and a first reflective electrode 402a are formed in the second TFT region 1002. Thereafter, the transferred resist masks are removed. Note that the first reflective electrode 402a is used as both a reflective electrode and a pixel electrode (see FIG. 10D).

Note that the wirings formed here are each appropriately connected to a TFT, the gate wiring which is exposed through the contact region, other elements, or the like, in accordance with the mask patterns.

In addition, at this time, the mask patterns are formed so that the first island-shaped impurity semiconductor layer 104a is exposed only over a region to be a channel formation region of a TFT, and the second island-shaped impurity semiconductor layer 104b is exposed only over a region to be a channel formation region of a TFT. Thereafter, the transferred resist masks are removed.

Then, the impurity semiconductor layer over a channel formation region of the first island-shaped semiconductor layer is etched in a self-aligned manner by using the first wiring 401a and the second wiring 401 each as a mask, thereby forming a first source region 105a and a first drain region 106a in the first TFT region 1001. Simultaneously, the impurity semiconductor layer over a channel formation region of the second island-shaped semiconductor layer is etched in a self-aligned manner by using the third wiring 401c and the first reflective electrode 402a each as a mask, thereby forming a second source region 105b and a second drain region 106b in the second TFT region 1002 (see FIG. 11A).

Here, an island-shaped semiconductor layer including the first island-shaped semiconductor layer 102a, the first source region 105a, and the first drain region 106a is regarded as a third island-shaped semiconductor layer 102c; and an island-shaped semiconductor layer including the second island-shaped semiconductor layer 102b, the second source region 105b, and the second drain region 106b is regarded as a fourth island-shaped semiconductor layer 102d (see FIG. 11A).

Next, a first interlayer insulating film 300 is formed (see FIG. 11B).

The first interlayer insulating film 300 is an insulating material which is formed using a CVD method, a sputtering method, or the like, for example, an insulating material containing silicon as its main component.

For example, a silicon nitride film is formed to have a film thickness of 200 nm. As the first interlayer insulating film 300, other insulating film containing silicon may be used in a single layer or stacked layer structure.

Then, the first interlayer insulating film 300 is etched after transferring a mask pattern thereto by a lithography method. Accordingly, a third contact region 900c is formed by exposing part of the first wiring 401a. Thereafter, the transferred resist mask is removed (see FIG. 11C).

In addition, simultaneously, a fourth contact region 900d is formed by exposing part of the second wiring 401b, and a fifth contact region 900e is formed by exposing part of the third wiring 401c.

Next, a red color filter film 711 is formed (see FIG. 11D).

Then, mask patterns are exposed and developed by a lithography method. Accordingly, a first red color filter region 711a is formed in the first opposite region 2001, and a second red color filter region 711b is formed in the second opposite region 2002 (see FIG. 12A).

The red color filter film 711 is a red color resist which is formed using a spin coating method or the like.

For example, the color resist is formed to have a film thickness of 1.0 μm.

Next, a green color filter film 721 is formed, and mask patterns are exposed and developed by a lithography method. Accordingly, a first green color filter region 721a is formed in the first opposite region 2001, and a second green color filter region 721b is formed in the second opposite region 2002.

The green color filter film 721 is a green color resist which is formed using a spin coating method or the like.

For example, the color resist is formed to have a film thickness of 1.0 μm.

Then, a blue color filter film 731 is formed, and mask patterns are exposed and developed by a lithography method. Accordingly, a first blue color filter region 731a is formed in the first opposite region 2001, and a second blue color filter region 731b is formed in the second opposite region 2002.

The blue color filter film 731 is a blue color resist which is formed using a spin coating method or the like.

For example, the color resist is formed to have a film thickness of 1.0 μm.

Next, a second interlayer insulating film 500 is formed (see FIG. 12B).

The second interlayer insulating film 500 is an insulating material which is formed using a spin coating method or the like.

For example, acrylic is formed to have a film thickness of 1 μm. Besides acrylic, the second interlayer insulating film 500 can be formed using any material without particular limitation as long as the structure thereof contains at least one layer of a material at least containing polyimide, siloxane, and the like as its main component.

The effect of planarization can be obtained by using these materials.

Then, the second interlayer insulating film 500 is etched after transferring mask patterns thereto by a lithography method. Accordingly, a first insulating region 501a and a second insulating region 501b are formed (see FIG. 12C).

Next, a transparent conductive film 600 is formed (see FIG. 12D).

The transparent conductive film 600 is a conductive film having high transmissivity which is formed using a sputtering method or the like.

For example, indium tin oxide (hereinafter, referred to as ITO) is formed to have a film thickness of 90 nm. Besides ITO, the transparent conductive film 600 can be formed using a film including a material such as indium tin oxide containing a Si element (hereinafter, referred to as ITSO), or IZO (Indium Zinc Oxide) where indium oxide is mixed with 2 to 20% of zinc oxide (ZnO); or a compound with the combination thereof.

Figure 13:
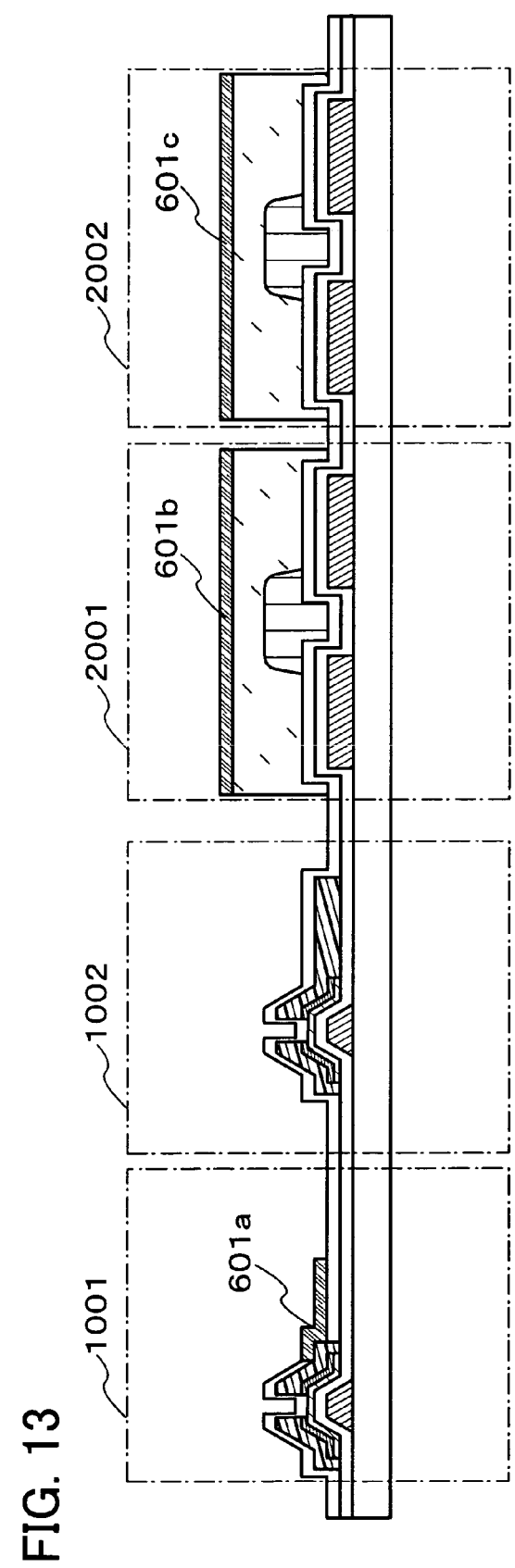
FIG. 13 is a method for manufacturing a bottom-gate TFT and an opposite region (a cross-sectional view)

Then, the transparent conductive film 600 is etched after transferring mask patterns thereto by a lithography method. Accordingly, a first transparent electrode 601a is formed in the first TFT region, a second transparent electrode 601b is formed in the first opposite region, and a third transparent electrode 601c is formed in the second opposite region. Thereafter, the transferred resist masks are removed (see FIG. 13).

As described through the above, the following can be manufactured over one substrate: the transmission or semi-transmission type first TFT region 1001; the reflective type second TFT region 1002; the first opposite region 2001 which is disposed on the opposite side of the first TFT region 1001; and the second opposite region 2002 which is disposed on the opposite side of the second TFT region 1002.

Next, a liquid crystal panel is manufactured by the method described in Embodiment Mode 1.

Figure 19:
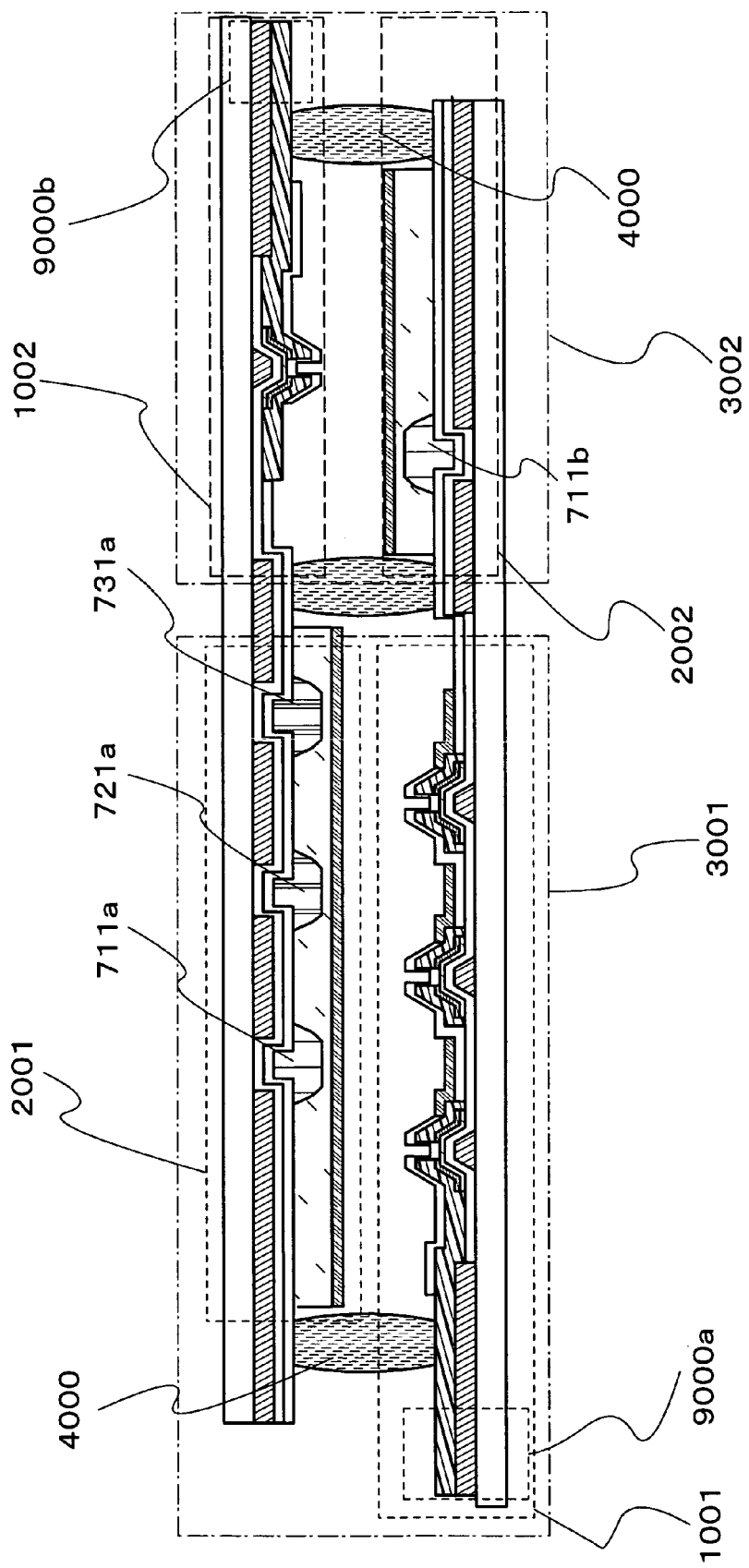
FIG. 19 is a method for manufacturing a top-gate TFT and an opposite region (a cross-sectional view)

The liquid crystal panel has a first liquid crystal display region 3001 and a second liquid crystal display region 3002. The first liquid crystal display region 3001 has an FPC connection wiring 9000a therein, and the second liquid crystal display region 3002 has an FPC connection wiring 9000b therein (see FIG. 19; FIG. 19 exemplifies a view where a basic disposition of Embodiment Mode 1 is applied to this embodiment mode).

As described through the above, the number of the masks, the number of device processing times, and the materials that are used can be reduced. Consequently, the yield can be improved and the cost can be reduced.

Embodiment Mode 5

Figure 20:
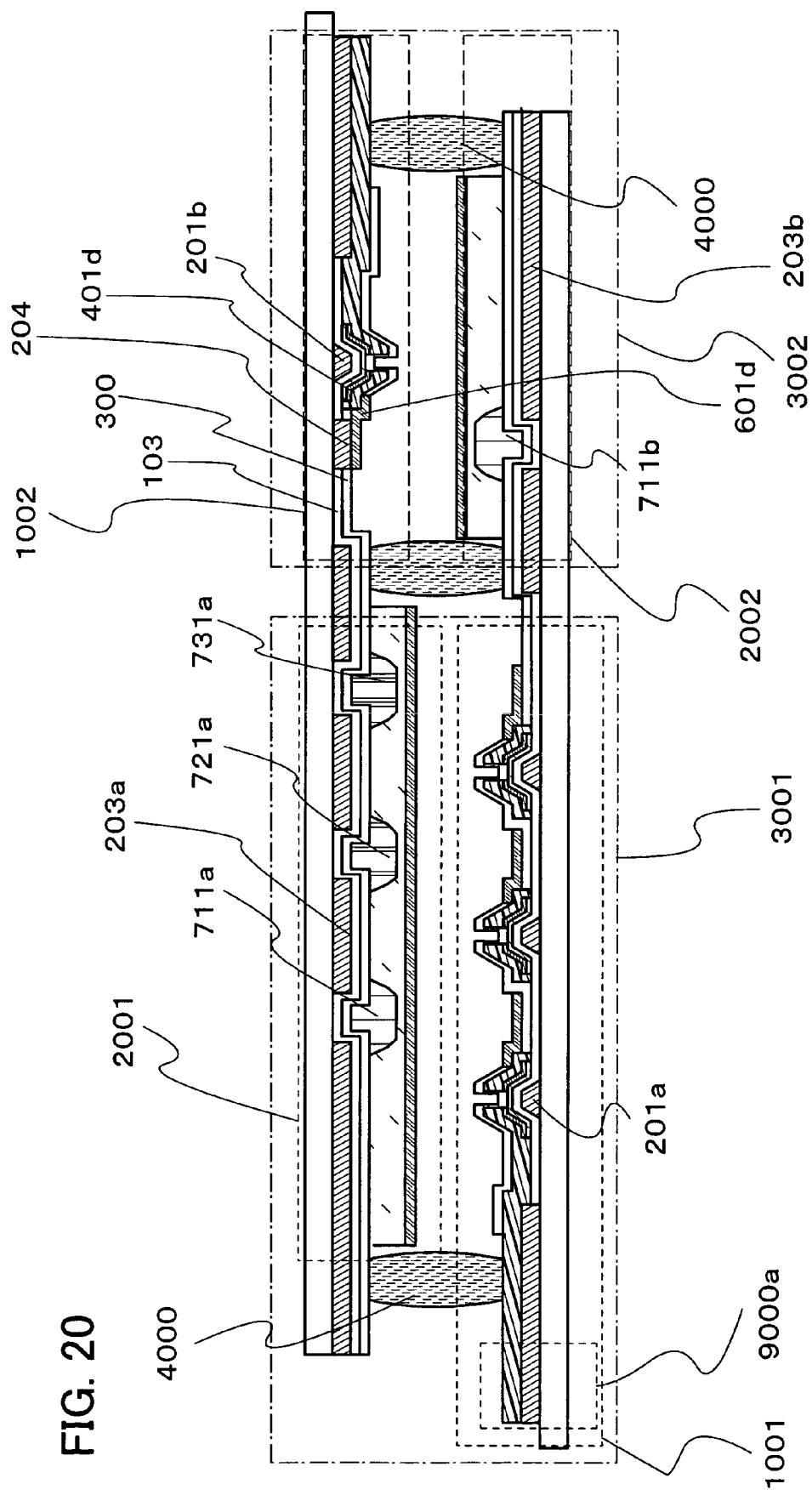
FIG. 20 is a cross-sectional view of a double-sided display device (Embodiment Mode 5)
Figure 21:
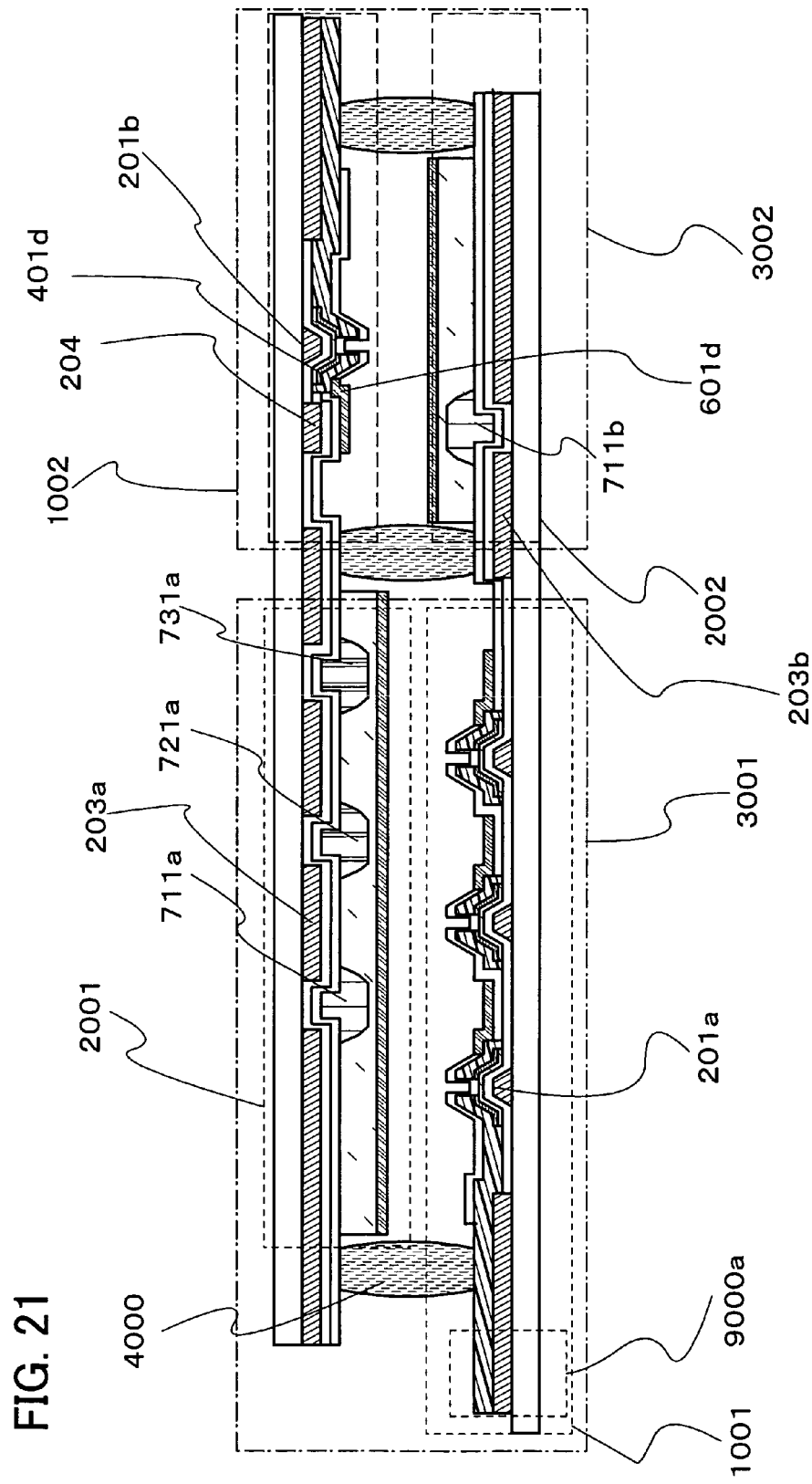
FIG. 21 is a cross-sectional view of a double-sided display device (Embodiment Mode 5)

In Embodiment Mode 4, the same material as the wiring is used for the reflective electrode which is formed in the second TFT region 1002; however, a transparent electrode may be used for a pixel electrode and a gate electrode material may be used for a reflective electrode without using the reflective electrode as both a reflective electrode and a pixel electrode (see FIG. 20 and FIG. 21).

For example, a second reflective electrode 204 can be disposed in the lower layer of the pixel electrode through a gate insulating film 103 and a first interlayer insulating film 300 (see FIG. 20).

As the manufacturing method of this case, in the case of Embodiment Mode 4, the second reflective electrode 204 may be formed at the time of forming the mask patterns of the first conductive film 200, a fourth wiring 401d may be formed instead of the first reflective electrode 402a at the time of forming the mask patterns of the second conductive film 400, and a fourth transparent electrode 601d may be formed at the time of forming the mask patterns of the transparent conductive film 600.

In addition, the second reflective electrode 204 and the fourth transparent electrode 601d can be formed by being in contact with each other (see FIG. 21).

As the manufacturing method of this case, in the case of Embodiment Mode 4, the second reflective electrode 204 may be formed at the time of forming the mask patterns of the first conductive film 200, the gate insulating film 103 over the second reflective electrode 204 may be removed at the time of forming the mask patterns of the gate insulating film 103, the first interlayer insulating film 300 over the second reflective electrode 204 may be removed at the time of forming the mask pattern of the first interlayer insulating film 300, the fourth wiring 401d may be formed without forming the first reflective electrode 402a at the time of forming the mask patterns of the second conductive film 400, and the fourth transparent electrode 601d may be formed at the time of forming the mask patterns of the transparent conductive film 600.

Embodiment Mode 6

Figure 22:
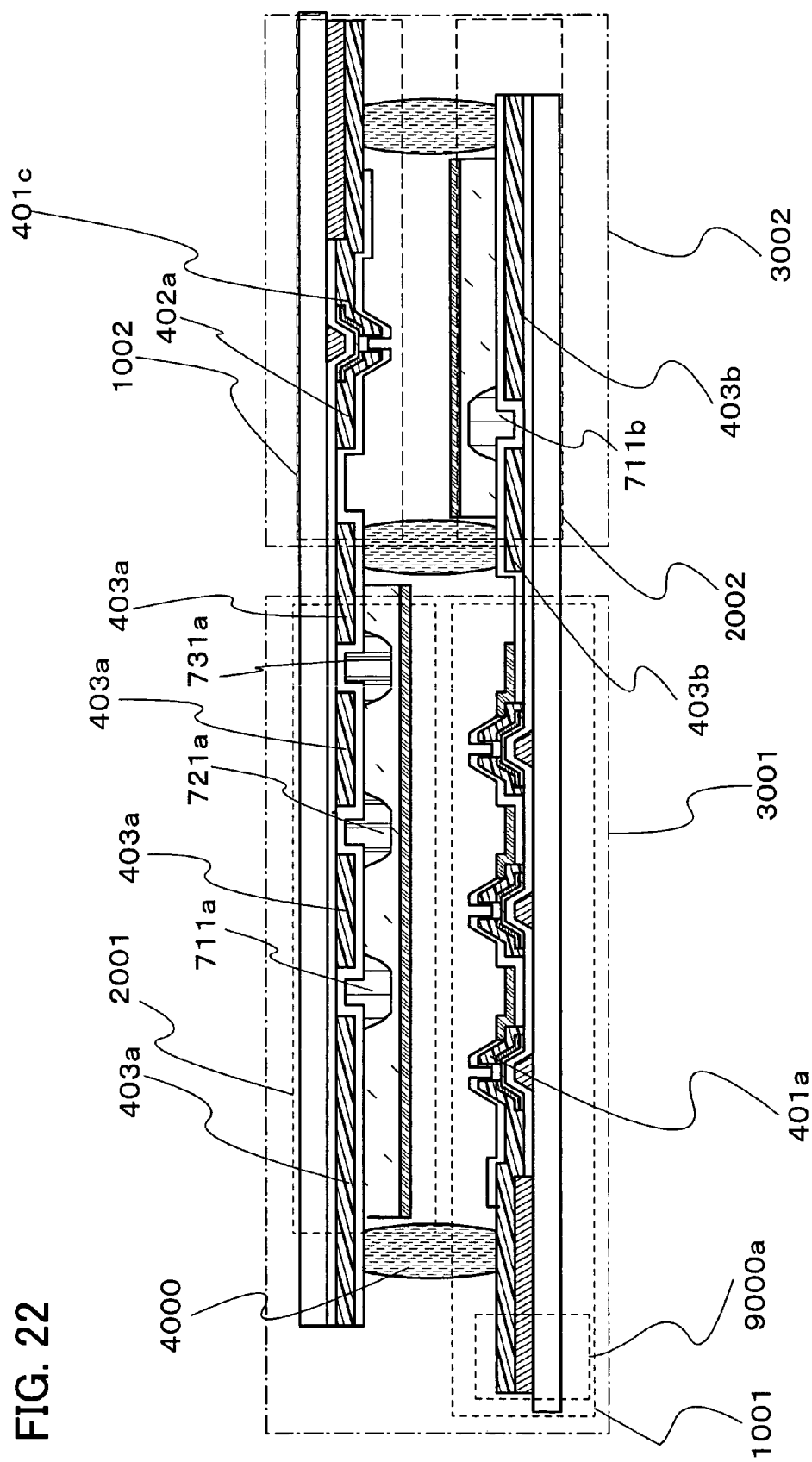
FIG. 22 is a cross-sectional view of a double-sided display device (Embodiment Mode 6)
Figure 23:
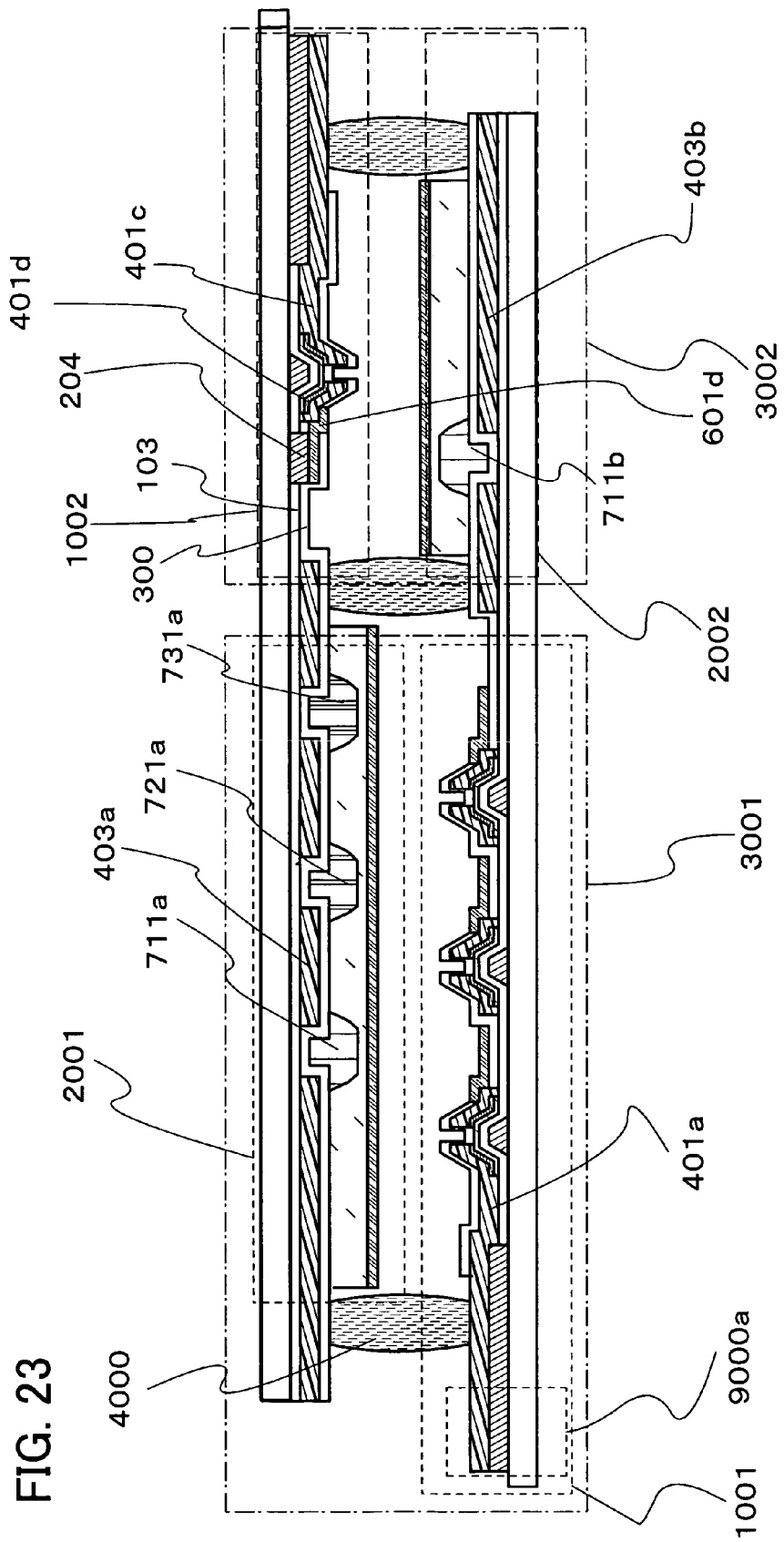
FIG. 23 is a cross-sectional view of a double-sided display device (Embodiment Mode 6)
Figure 24:
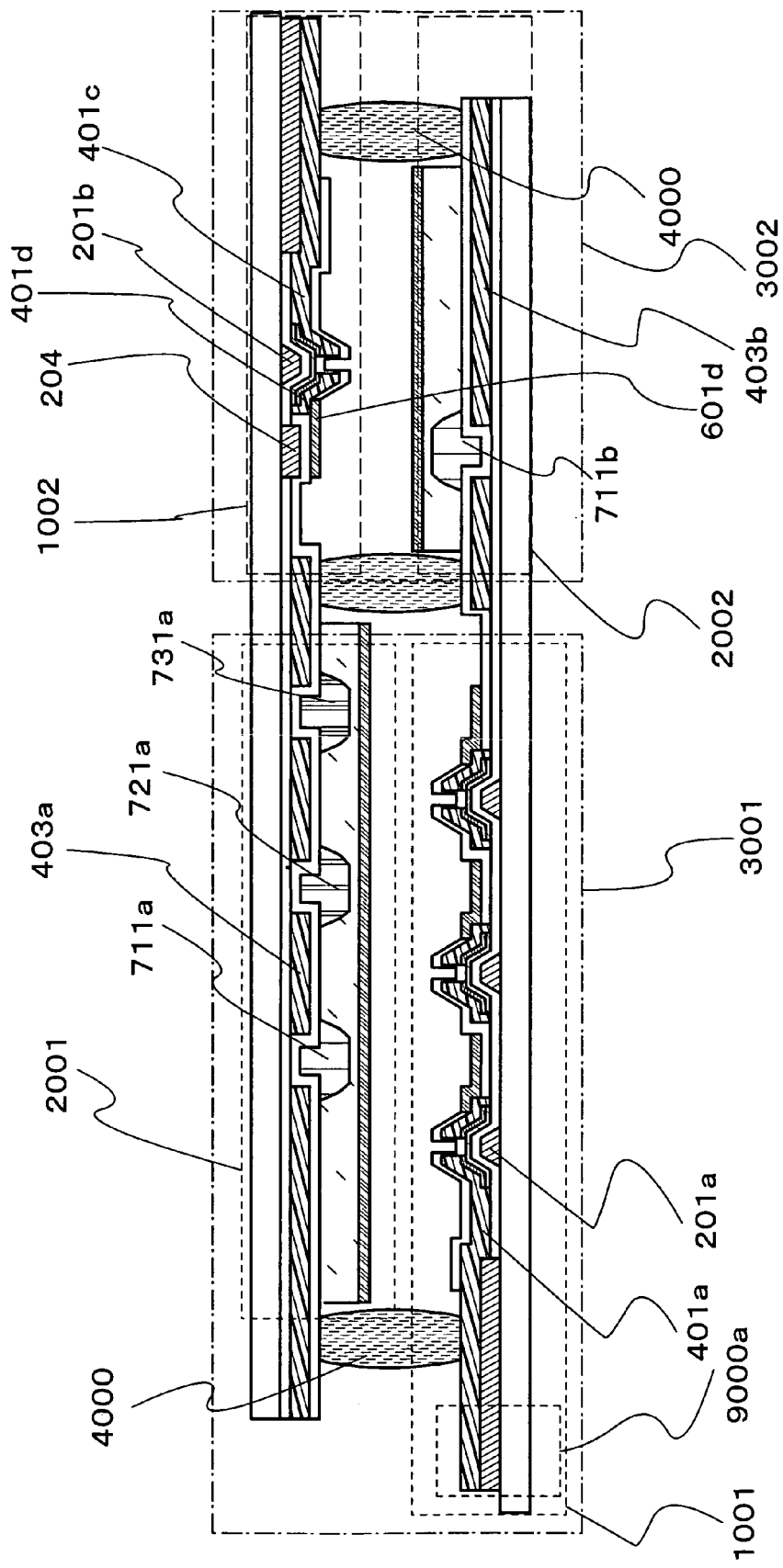
FIG. 24 is a cross-sectional view of a double-sided display device (Embodiment Mode 6)

In Embodiment Modes 4 and 5, the same material as a gate electrode is used for the material of a black matrix; however, the same material as a wiring film may also be used for the material of a black matrix (see FIG. 22, FIG. 23, and FIG. 24).

As the manufacturing method of this case, in the case of Embodiment Mode 4, without forming the first black matrixes 203a and the second black matrixes 203b at the time of forming the mask patterns of the first conductive film 200, a third black matrix 403a may be formed in the first opposite region 2001 and a fourth black matrix 403b may be formed in the second opposite region 2002 at the time of forming the mask patterns of the second conductive film 400.

Embodiment Mode 7

This embodiment mode will show an example of a manufacturing method of the substrate described in Embodiment Mode 2. Note that, since the same manufacturing method as Embodiment Mode 4 is used, the explanation is made only for portions different from Embodiment Mode 4.

As the manufacturing method of this embodiment mode, in the case of Embodiment Mode 4, in the second opposite region 2002, a third reflective electrode 205 is formed without forming the second black matrixes 203b at the time of forming the mask patterns of the first conductive film 200, a fourth wiring 401d is formed without forming the first reflective electrode 402a at the time of forming the mask patterns of the second conductive film 400, and a fourth transparent electrode 601d is formed at the time of forming the mask patterns of the transparent conductive film 600. Thereafter, third black matrixes 800 are formed in the second opposite region 2002 by a mask pattern transferring technique.

The third black matrixes are formed using, for example, black organic films.

Figure 25:
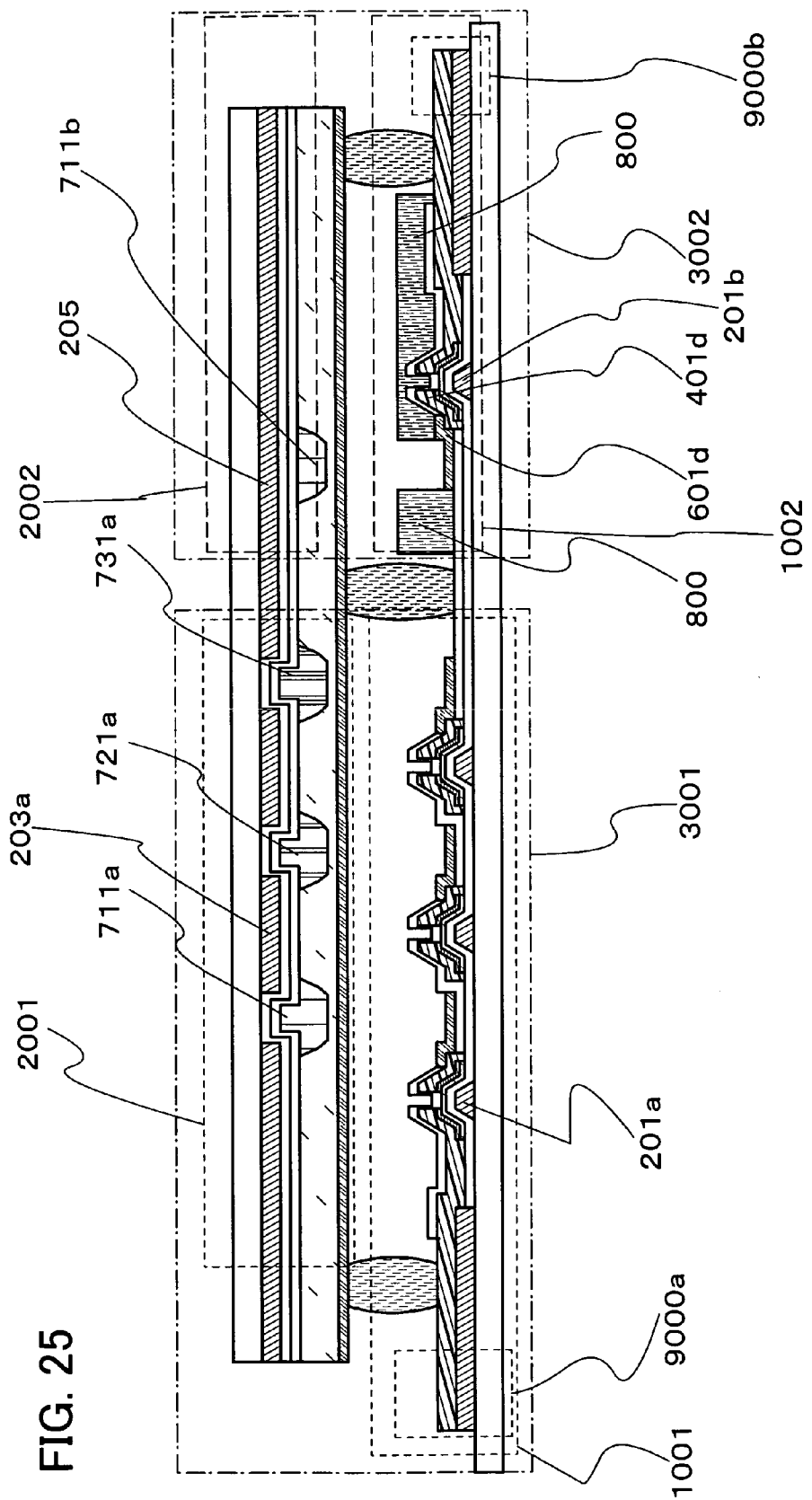
FIG. 25 is a cross-sectional view of a double-sided display device (Embodiment Mode 7)

Accordingly, it is possible to form a transmission or semi-transmission type first liquid crystal display region 3001 and a reflective type second liquid crystal display region 3002 (see FIG. 25).

Embodiment Mode 8

Figure 26:
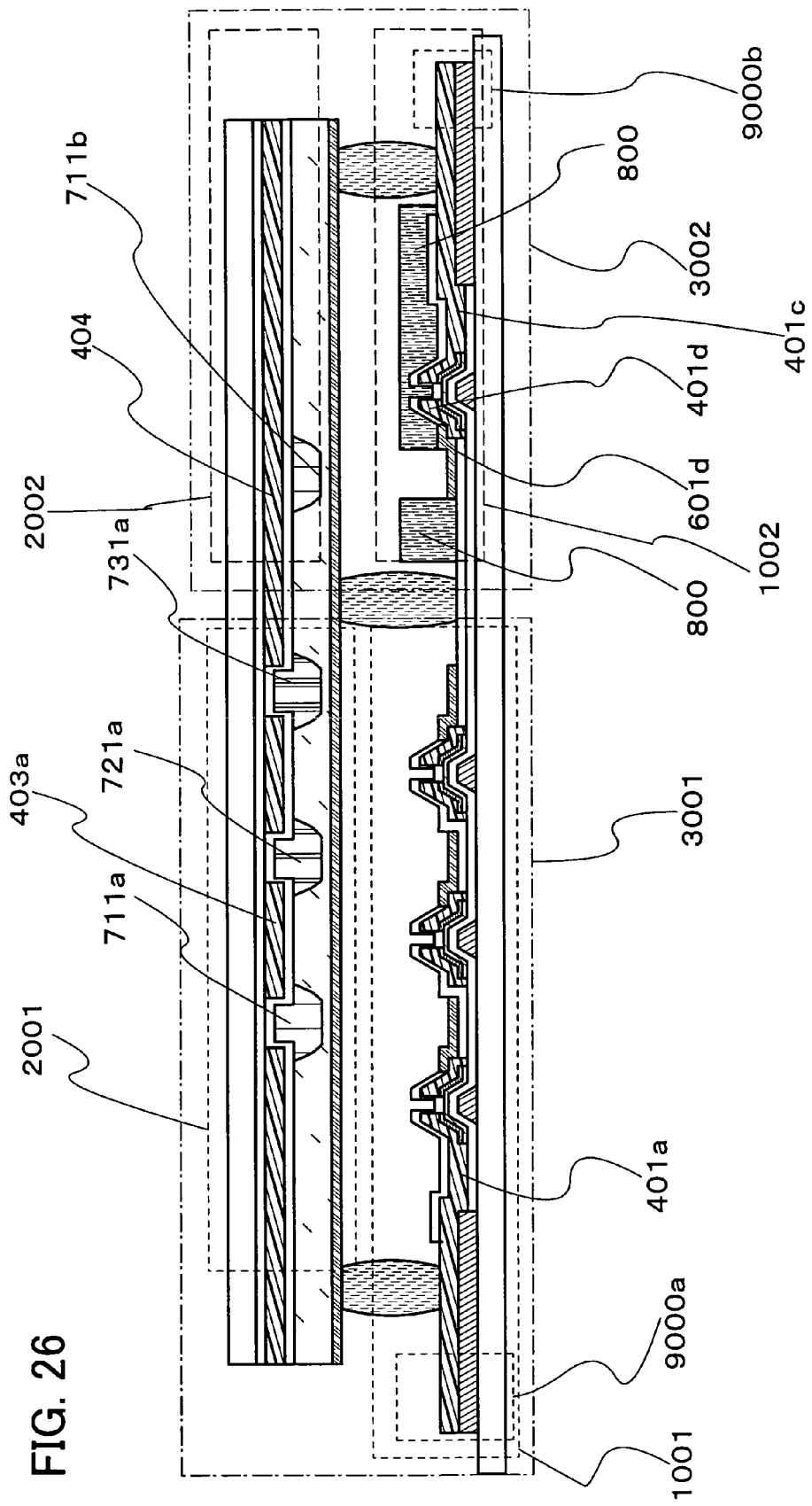
FIG. 26 is a cross-sectional view of a double-sided display device (Embodiment Mode 8)

The same material as the first conductive film 200 is used for the third reflective electrode 205 of the second opposite region 2002 in Embodiment Mode 7; however, the same material as the second conductive film 400 can be used for the third reflective electrode 205 (see FIG. 26).

As the manufacturing method of this case, in the case of Embodiment Mode 7, in the second opposite region 2002, without forming the third reflective electrode 205 at the time of forming the mask patterns of the first conductive film 200, a fourth reflective electrode 404 may be formed in the second opposite region 2002 at the time of forming the mask patterns of the second conductive film 400.

Embodiment Mode 9

Figure 27:
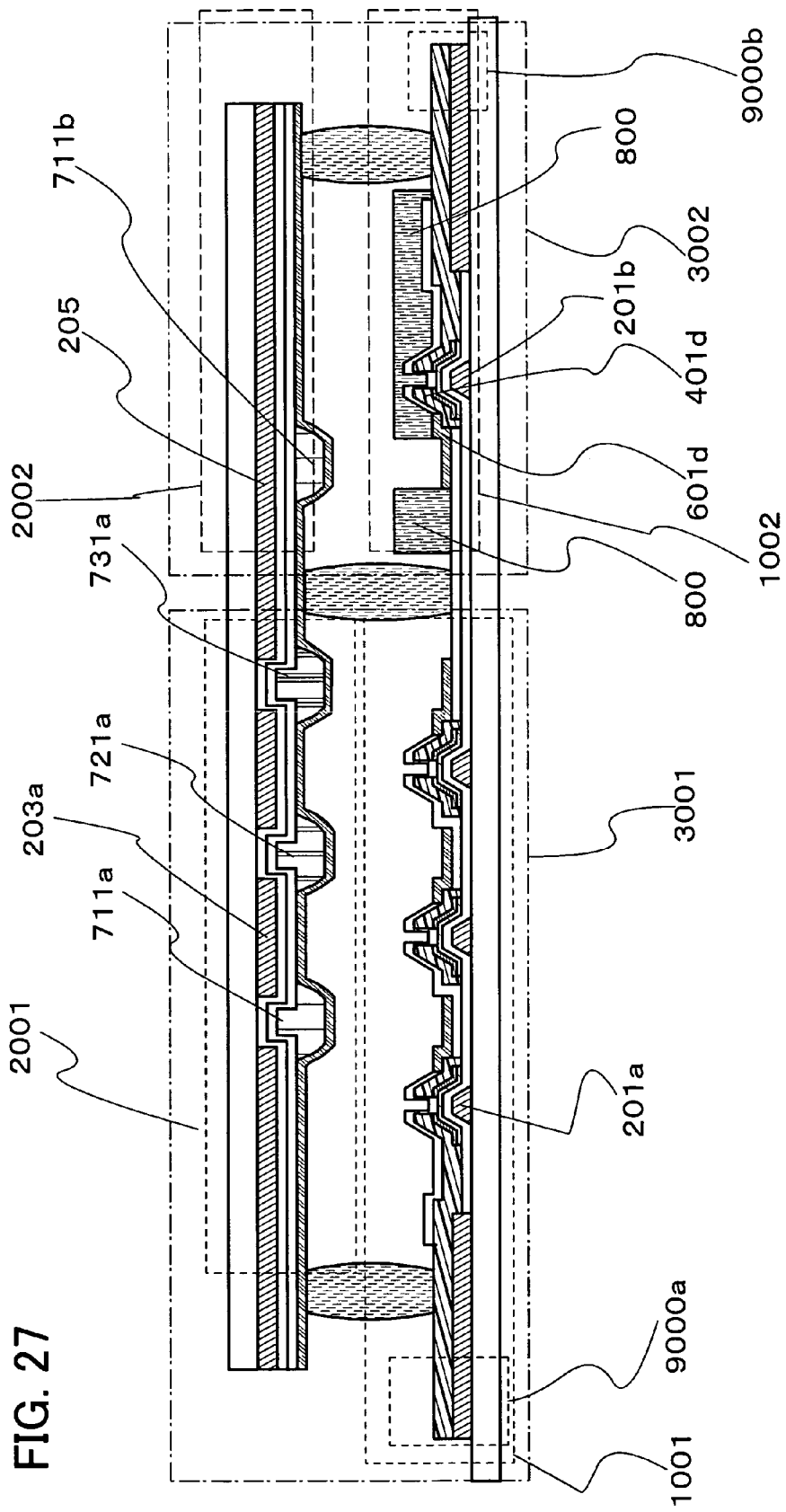
FIG. 27 is a cross-sectional view of a double-sided display device (Embodiment Mode 9)

In embodiment mode 7, it is not always necessary to form the second interlayer insulating film 500 (see FIG. 27).

In Embodiment Mode 7 of this case, the steps of forming the second interlayer insulating film 500 and forming the mask patterns of the second interlayer insulating film 500 may be excluded.

In the case of this embodiment mode, since it is not necessary to form the second interlayer insulating film 500, the number of the masks, the number of device processing times, and the materials that are used can be reduced. Consequently, the yield can be improved and the cost can be reduced.

Embodiment Mode 10

Figure 28:
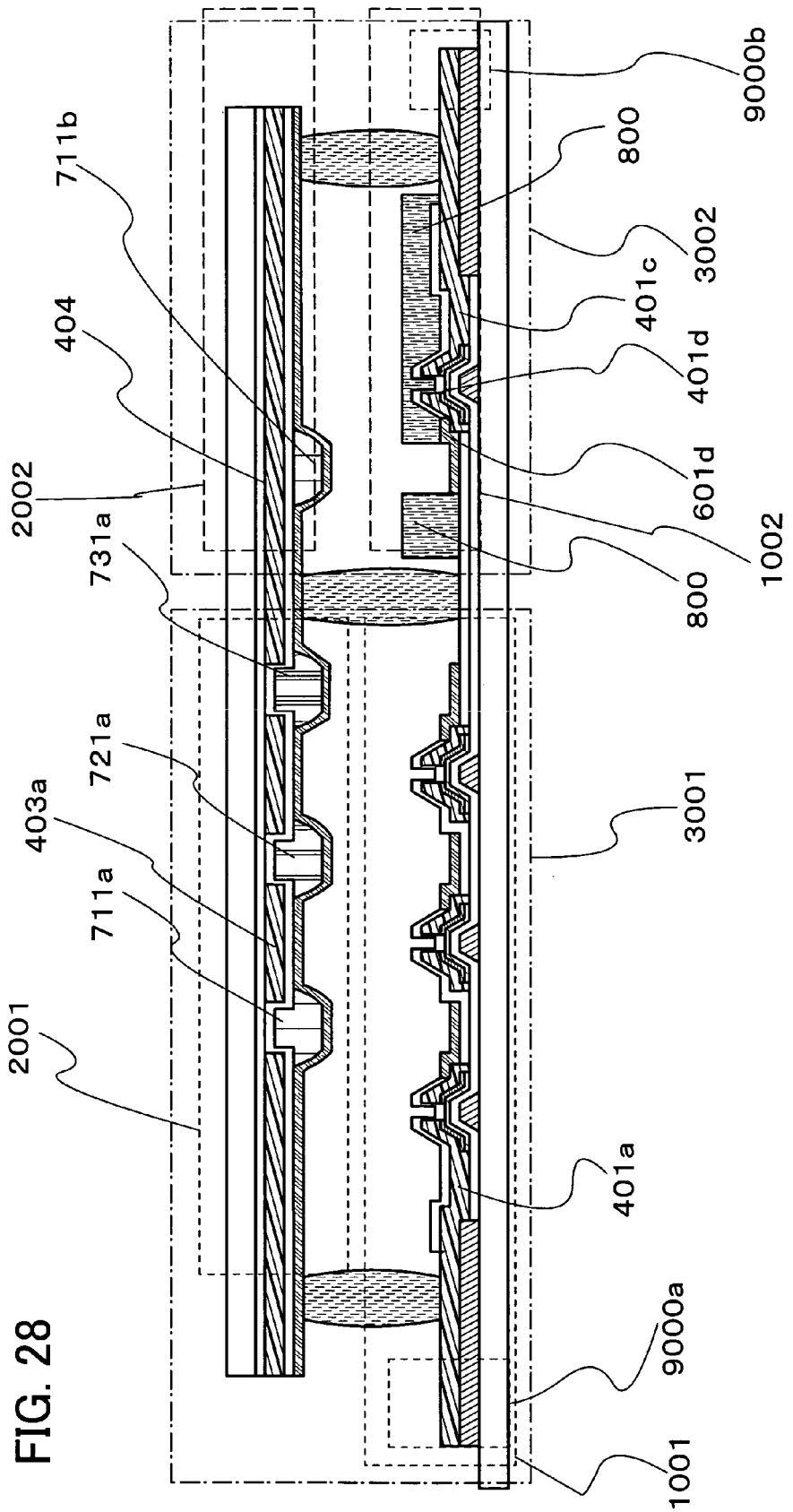
FIG. 28 is a cross-sectional view of a double-sided display device (Embodiment Mode 10)

In Embodiment Mode 8, it is not always necessary to form the second interlayer insulating film 500 (see FIG. 28).

In Embodiment Mode 8 of this case, the steps of forming the second interlayer insulating film 500 and forming the mask patterns of the second interlayer insulating film 500 may be excluded.

In the case of this embodiment mode, since it is not necessary to form the second interlayer insulating film 500, the number of the masks, the number of device processing times, and the materials that are used can be reduced. Consequently, the yield can be improved and the cost can be reduced.

Embodiment Mode 11

Figure 29:
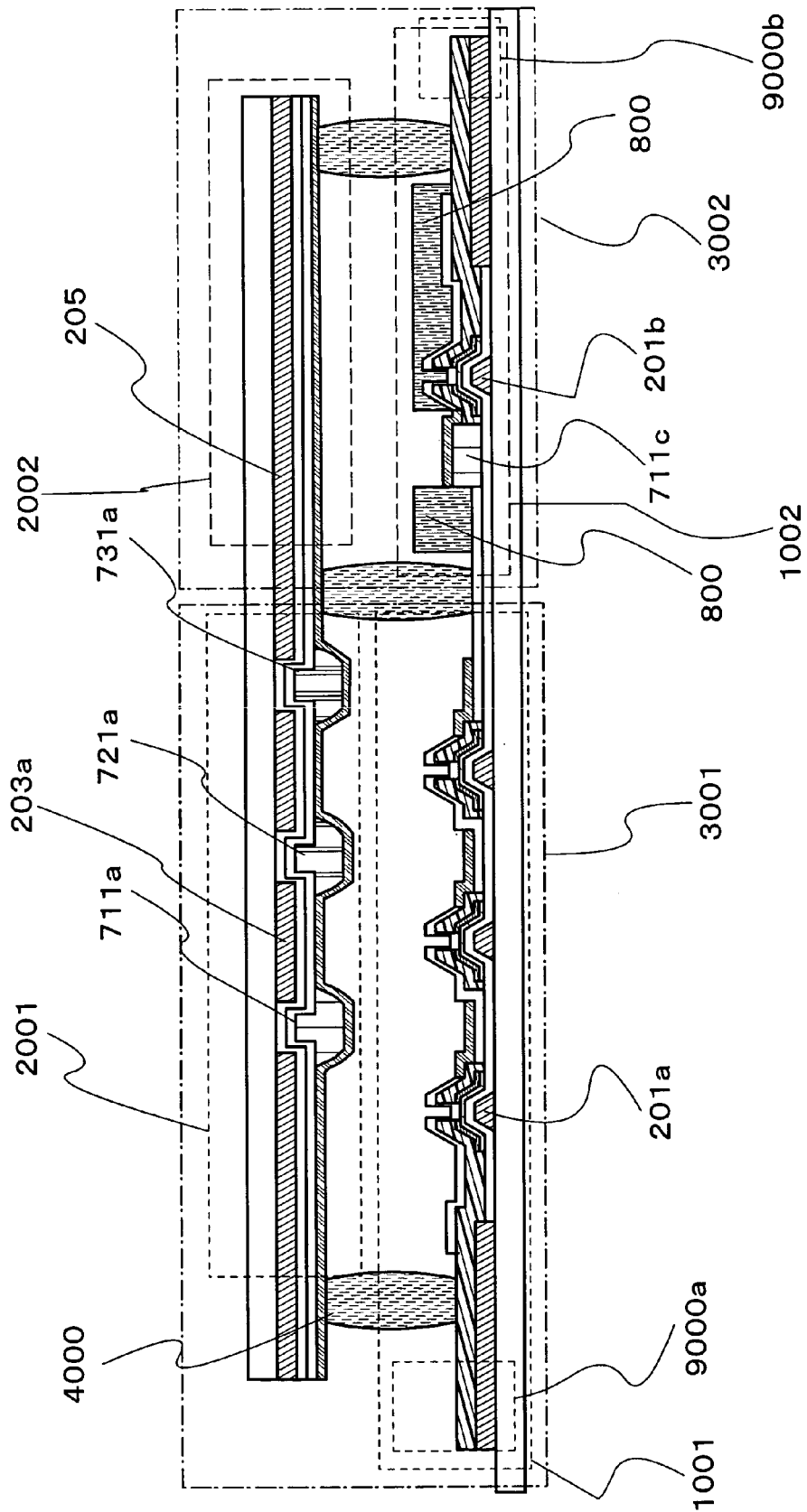
FIG. 29 is a cross-sectional view of a double-sided display device (Embodiment Mode 11)

In Embodiment Mode 9, it is possible to form a color filter region in a second TFT region 1002 (see FIG. 29).

In this case, without forming a color filter region in a second opposite region 2002 at the time of forming the color filter regions in Embodiment Mode 9, the color filter region may be formed so as to be disposed below a fourth transparent electrode 601d of the second TFT region 1002.

In this case, since the color filter region is disposed on the substrate surface which is to be a display surface, much clearer display can be obtained.

Embodiment Mode 12

Figure 30:
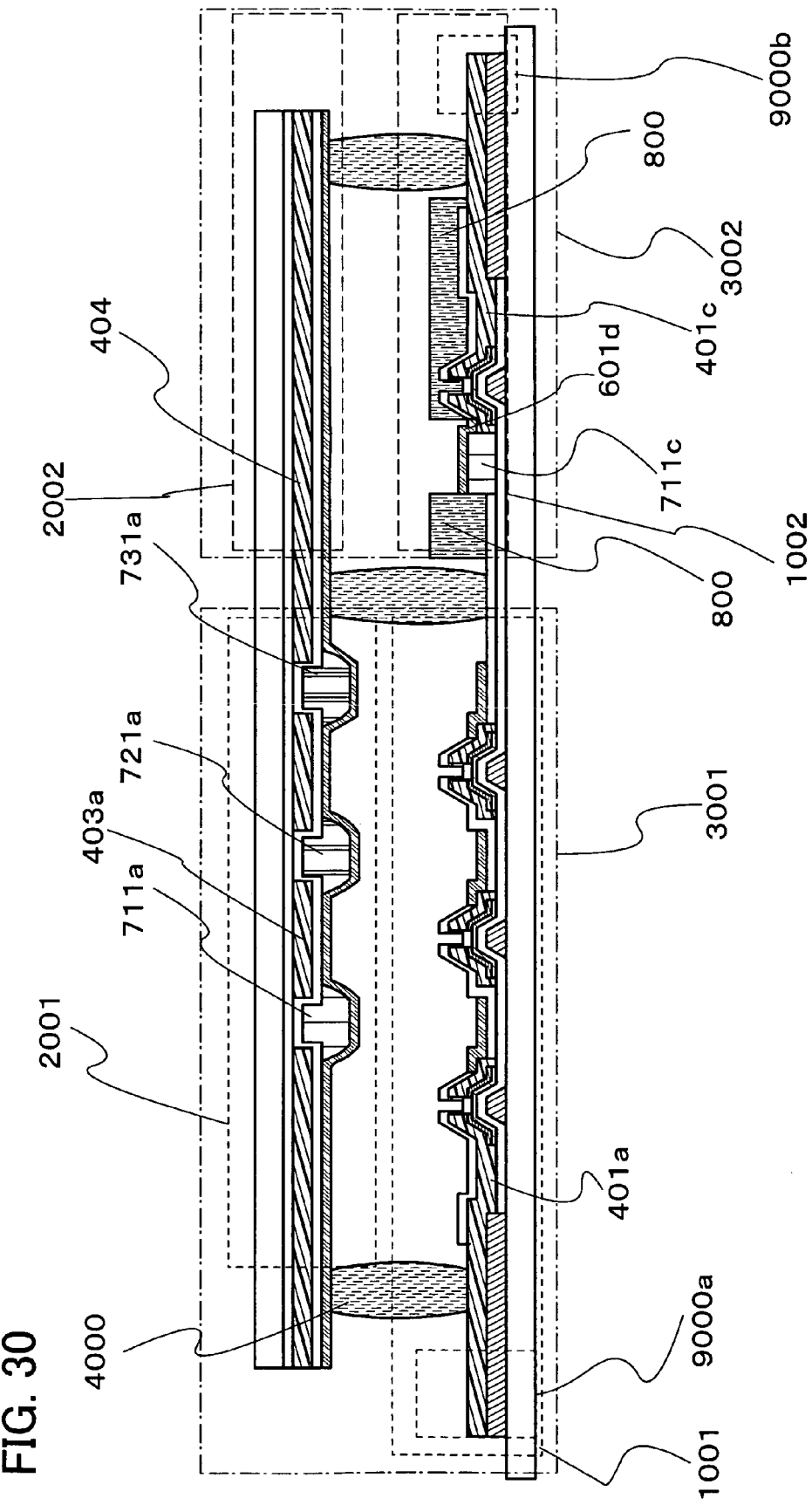
FIG. 30 is a cross-sectional view of a double-sided display device (Embodiment Mode 12)

In Embodiment Mode 10, it is possible to form a color filter region in a second TFT region 1002 (see FIG. 30).

In this case, without forming a color filter region in a second opposite region 2002 at the time of forming the color filter region in Embodiment Mode 10, the color filter may be formed so as to be disposed below a fourth transparent electrode 601d of the second TFT region 1002.

In this case, since the color filter region is disposed on the substrate surface which is to be a display surface, much clearer display can be obtained.

Embodiment Mode 13

This embodiment mode will explain an example of a method for manufacturing, over one substrate, a first TFT region 1001 and a first opposite region 2001 of a transmission or semi-transmission type liquid crystal display device, and a second TFT region 1002 and a second opposite region 2002 of a reflective type liquid crystal display device.

This embodiment mode will explain an example of a method for manufacturing top-gate TFTs for TFTs of the first TFT region 1001 and the second TFT region 1002.

Note that, in the drawings used for explaining this embodiment mode, for convenience, the explanation is made showing, in the drawings, one of the TFTs of the first TFT region 1001, one of the TFTs of the second TFT region 1002, one of color filters of the first opposite region 2001, and one of color filters of the second opposite region 2002 (a red color filter region). Each TFT region has a plurality of TFTs, an element, which is necessary, a wiring, or the like; and each opposite region has a green color filter region, a blue color filter region, and the like, which are not shown in the drawings.

In addition, the present invention can be implemented with various modes. Moreover, it is to be easily understood to those skilled in the art that various changes and modifications will be apparent. Therefore, unless such changes and modifications depart from the purport and the scope of the present invention, they should be construed as being included therein.

Note that the same portions or portions having the same function in all drawings for explaining embodiment modes are denoted by the same reference numerals and repeated explanations thereof will be omitted.

Figure 14:
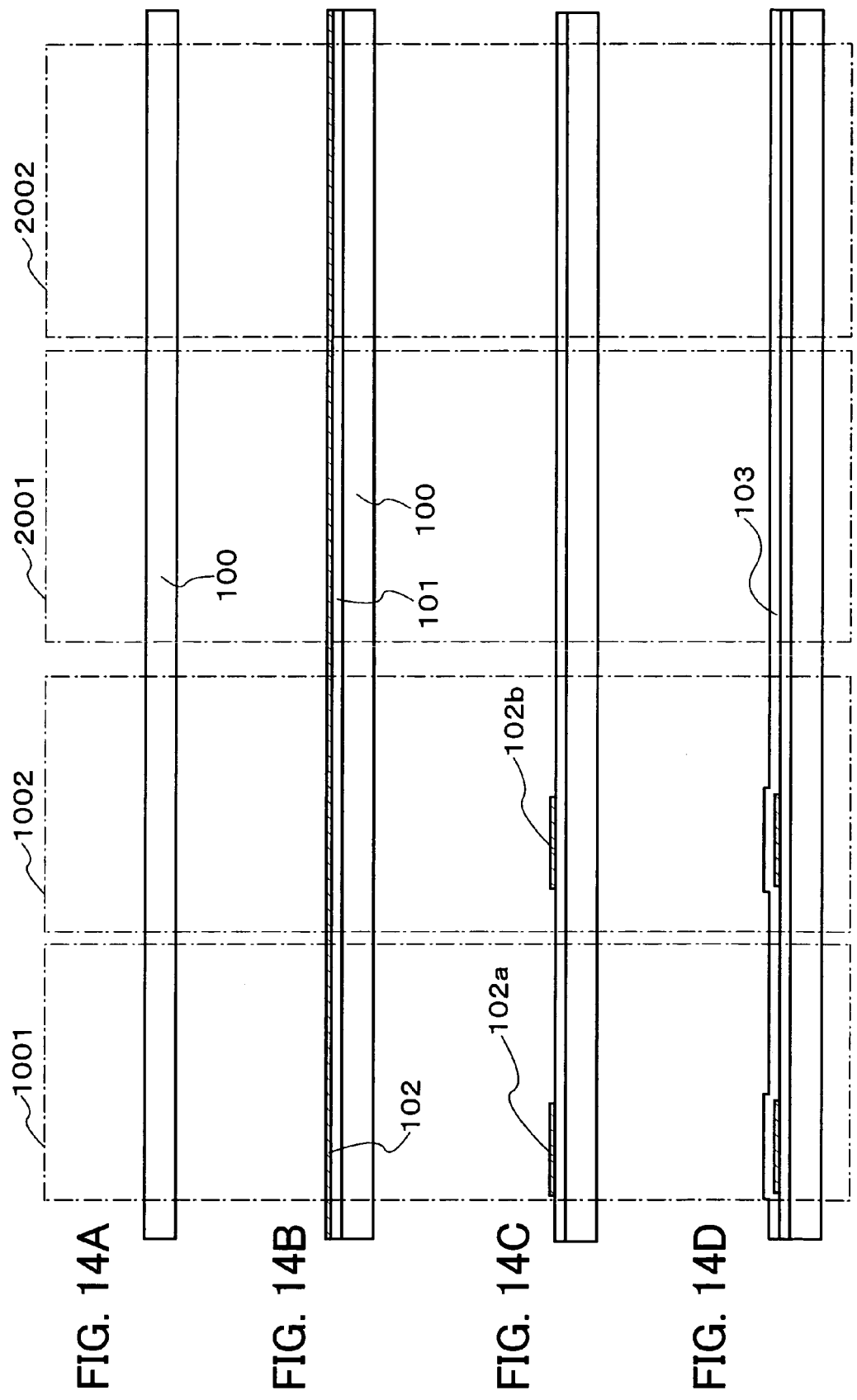
FIGS. 14A to 14D are each a method for manufacturing a top-gate TFT and an opposite region (a cross-sectional view)

First, a substrate 100 is prepared (see FIG. 14A).

As the substrate 100, a substrate made of glass such as barium borosilicate glass or alumino borosilicate glass, quartz, a silicon wafer, or the like can be used. These materials can be appropriately selected depending on intended use of a semiconductor device or a process condition such as temperature.

If the substrate 100 can withstand a processing temperature, a substrate made of a plastic material having high heat resistance, for example, polycarbonate, polyimide, or an acrylic material can also be used. In addition, the shape of the substrate 1 has either a flat surface or a curved surface, or both, and a substrate having a shape of a flat plate, a stripe, or an elongated shape is appropriately selected depending on a process or a manufacturing apparatus.

Next, a base insulating film 101 is formed over the substrate 100, and a first semiconductor film 102 is formed over the base insulating film 101 (see FIG. 14B).

The base insulating film 101 is a film for preventing impurities from diffusing from the substrate 100 and, for example, silicon oxide nitride is formed to have a thickness of 100 nm. Besides silicon oxide nitride, the base insulating film 101 can be formed using a single layer or a stacked layer of silicon nitride oxide, silicon oxide, silicon nitride, or the like.

The first semiconductor film 102 is a semiconductor material which is formed using a CVD method, a sputtering method, or the like.

For example, an amorphous silicon film is formed to have a film thickness of 54 nm. The material of the first semiconductor film 102 is not limited to silicon and other semiconductor materials can be appropriately selected.

In addition, in order to enhance crystallinity of the first semiconductor film 102, the crystallization may be performed with energy added by laser light irradiation, furnace annealing, RTA (Rapid Thermal Annealing), or the like.

An impurity ion may be introduced into the first semiconductor film 102 by doping or the like in order to control a threshold voltage of the TFT to be manufactured here.

Then, the first semiconductor film 102 is etched after transferring mask patterns thereto by a lithography method. Accordingly, a first island-shaped semiconductor layer 102a and a second island-shaped semiconductor layer 102b are formed in the first TFT region 1001. Thereafter, the transferred resist masks are removed (see FIG. 14C).

Next, a gate insulating film 103 is formed (see FIG. 14D).

The gate insulating film 103 is an insulating material which is formed using a CVD method, a sputtering method, or the like, for example, an insulating material containing silicon as its main component.

For example, a silicon oxynitride film is formed to have a film thickness of 100 nm. As the gate insulating film 103, other insulating film containing silicon may be used in a single layer or stacked layer structure.

Figure 15:
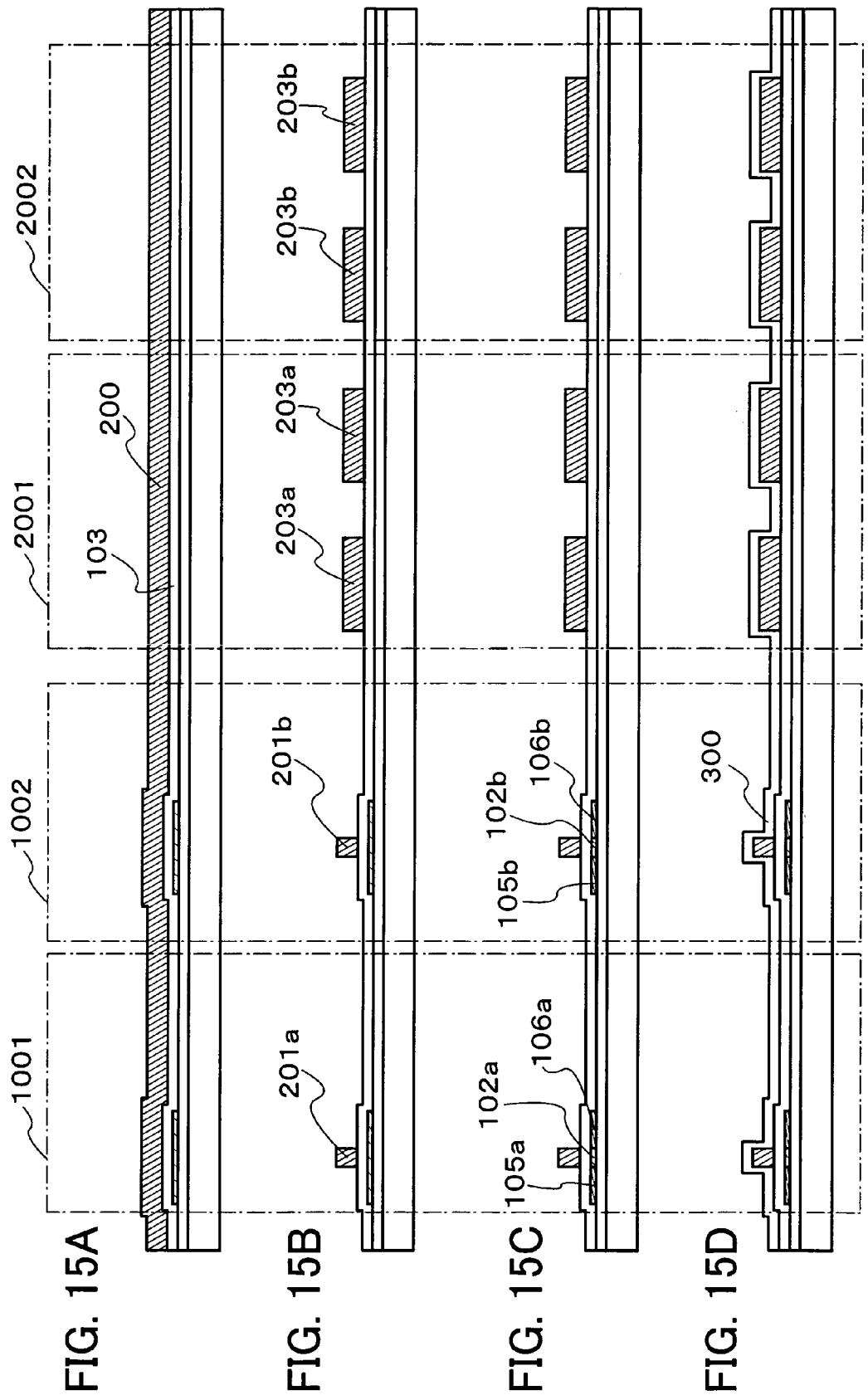
FIGS. 15A to 15D are each a method for manufacturing a top-gate TFT and an opposite region (a cross-sectional view)

Then, a first conductive film 200 is formed over the gate insulating film 103 (see FIG. 15A).

The first conductive film 200 is a conductive film formed of a conductive material by a sputtering method or the like, which is a material containing a conductive material or a semiconductor material as its main component.

For example, Mo (molybdenum) is formed to have a film thickness of 300 nm. Besides Mo (molybdenum), the first conductive film can be formed using any material without particular limitation as long as the structure thereof contains at least one layer of the following: a metal material such as Ta (tantalum), Ti (titanium), W (tungsten), or chromium (Cr); silicide which is a compound of these metal materials and silicon; a material such as polysilicon having N-type or P-type conductivity; and a material containing a low resistance metal material such as Cu (copper) or Al (aluminum) as its main component.

Next, the first conductive film 200 is etched after transferring mask patterns thereto by a lithography method. Accordingly, a first gate electrode 201a and a first gate wiring 202a are formed in the first TFT region 1001, a second gate electrode 201b and a second gate wiring 202b are formed in the second TFT region 1002, first black matrixes 203a are formed in the first opposite region 2001, and second black matrixes 203b are formed in the second opposite region 2002. Thereafter, the transferred resist masks are removed (see FIG. 15B).

By simultaneously manufacturing the black matrixes and the gate electrodes over the substrate surface by using the same material, the number of the masks, the number of device processing times, and the materials that are used can be reduced. Consequently, the yield can be improved and the cost can be reduced.

Then, implantation of an impurity ion is performed into the first island-shaped semiconductor layer 102a and the second island-shaped semiconductor layer 102b to form a first source region 105a and a first drain region 106a in the first TFT region 1001, and a second source region 105b and a second drain region 106b in the second TFT region 1002 (see FIG. 15C).

As an impurity implantation method, an ion implantation method, a plasma doping method, or an ion shower doping method is possible, and, as an ion to be implanted, a donor-type element (for example, P (phosphorus) or As (arsenic)) is implanted in a case of obtaining an n-channel TFT, and an acceptor-type element (for example, B (boron)) is implanted in a case of obtaining a p-channel TFT.

In addition, in a case of manufacturing a so-called CMOS circuit where an n-channel TFT and a p-channel TFT are disposed within a substrate surface, when a donor-type element is implanted, the implantation is performed after a region to be a p-channel TFT is covered with a mask, and when an acceptor-type element is implanted, the implantation is performed after a region to be an n-channel TFT is covered with a mask.

Note that, for example, a lithography method is used for forming masks.

Next, a first interlayer insulating film 300 is formed (see FIG. 15D).

The first interlayer insulating film 300 is an insulating material which is formed using a CVD method, a sputtering method, or the like, for example, an insulating material containing silicon as its main component.

For example, a silicon nitride film is formed to have a film thickness of 100 nm. As the first interlayer insulating film 300, other insulating film containing silicon may be used in a single layer or stacked layer structure.

Then, annealing is performed to activate the implanted impurity ion.

The annealing is performed in a furnace annealing at 550° C. for an hour in a nitrogen atmosphere, for example. The annealing may be performed by RTA or laser irradiation.

Figure 16:
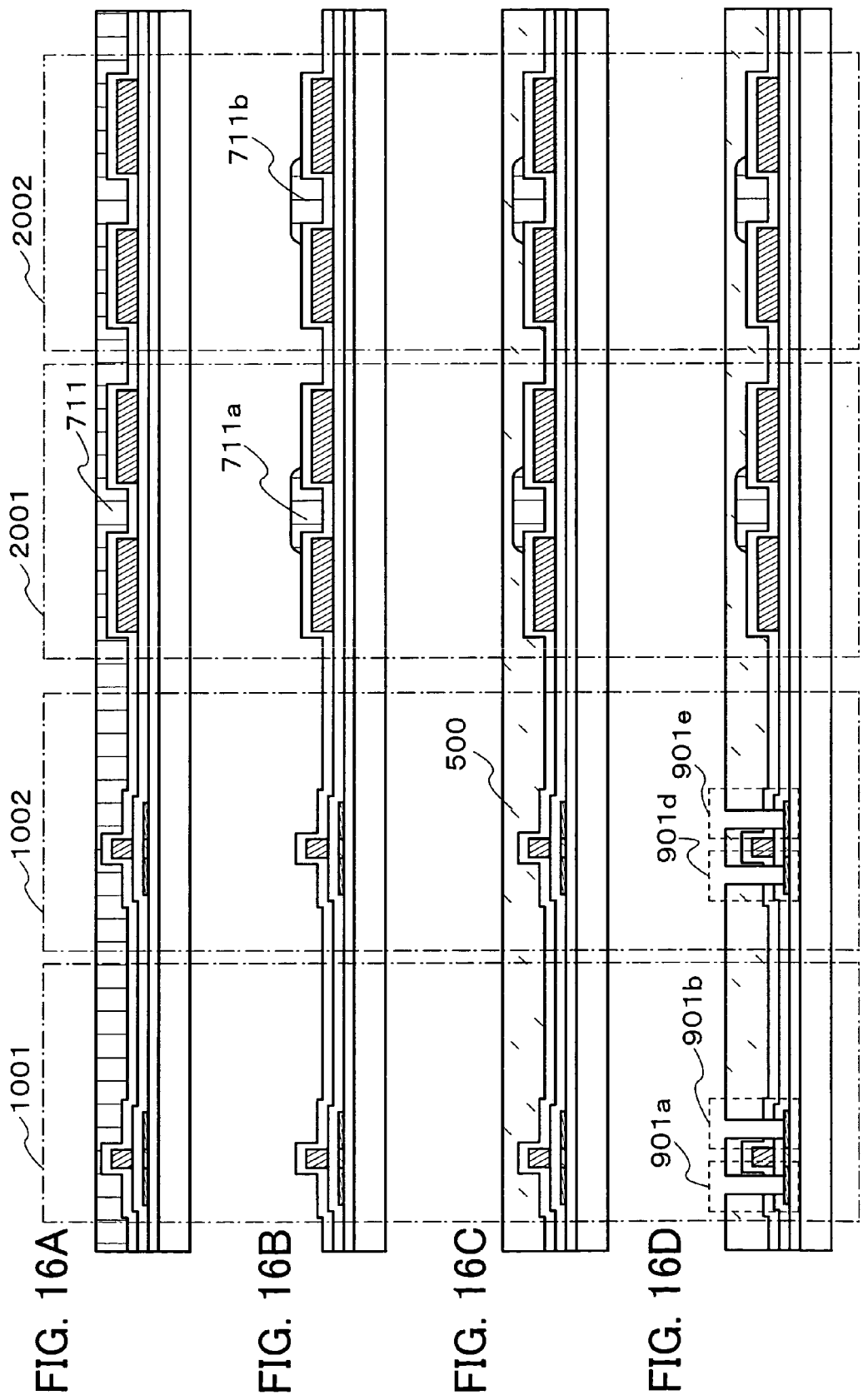
FIGS. 16A to 16D are each a method for manufacturing a top-gate TFT and an opposite region (a cross-sectional view)

Next, a red color filter film 711 is formed (see FIG. 16A).

Then, mask patterns are exposed and developed by a lithography method. Accordingly, a first red color filter region 711a is formed in the first opposite region 2001, and a second red color filter region 711b is formed in the second opposite region 2002 (see FIG. 16B).

The red color filter film 711 is a red color resist which is formed using a spin coating method or the like.

For example, the color resist is formed to have a film thickness of 1.0 μm.

Next, a green color filter film 721 is formed, and mask patterns are exposed and developed by a lithography method. Accordingly, a first green color filter region 721a is formed in the first opposite region 2001, and a second green color filter region 721b is formed in the second opposite region 2002.

The green color filter film 721 is a green color resist which is formed using a spin coating method or the like.

For example, the color resist is formed to have a film thickness of 1.0 μm.

Next, a blue color filter film 731 is formed, and mask patterns are exposed and developed by a lithography method. Accordingly, a first blue color filter region 731a is formed in the first opposite region 2001, and a second blue color filter region 731b is formed in the second opposite region 2002.

The blue color filter film 731 is a blue color resist which is formed using a spin coating method or the like.

For example, the color resist is formed to have a film thickness of 1.0 μm.

Next, a second interlayer insulating film 500 is formed (see FIG. 16C).

The second interlayer insulating film 500 is an insulating material which is formed using a spin coating method or the like.

For example, acrylic is formed to have a film thickness of 1 μm. Besides acrylic, the second interlayer insulating film 500 can be formed using any material without particular limitation as long as the structure thereof contains at least one layer of a material at least containing polyimide, siloxane, and the like as its main component.

The effect of planarization can be obtained by using these materials.

Next, the second interlayer insulating film 500 is etched after transferring mask patterns thereto by a lithography method. Accordingly, in the first TFT region, a first contact region 901a is formed by exposing part of the first source region 105a, a second contact region 901b is formed by exposing part of the first drain region 106a, and a third contact region 901c is formed by exposing part of the first gate electrode 201a; and, in the second TFT region, a fourth contact region 901d is formed by exposing part of the second source region 105b, a fifth contact region 901e is formed by exposing part of the second drain region 106b, and a sixth contact region 901f is formed by exposing part of the second gate electrode 201b (see FIG. 16D).

Since the second interlayer insulating film 500 over the first opposite region 2001 and the second opposite region 2002 is not removed here, a planarizing layer is formed in the first opposite region 2001 and the second opposite region 2002 (see FIG. 16D).

By simultaneously manufacturing the interlayer insulating materials of the TFT regions and the planarizing insulating material of the opposite region over the substrate surface by using the same material, the number of the masks, the number of device processing times, and the materials that are used can be reduced. Consequently, the yield can be improved and the cost can be reduced.

Figure 17:
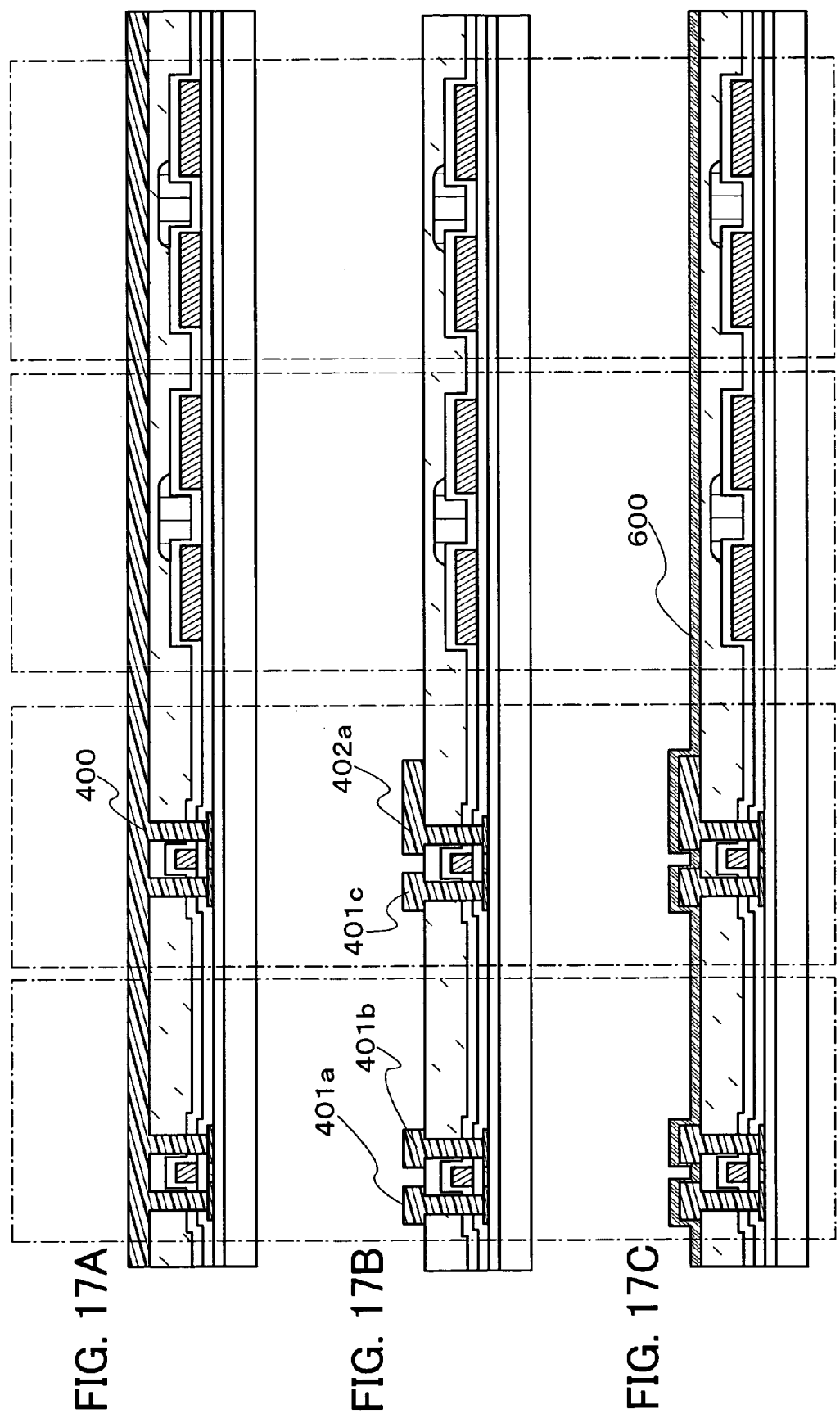
FIGS. 17A to 17C are each a method for manufacturing a top-gate TFT and an opposite region (a cross-sectional view)

Then, a second conductive film 400 is formed (see FIG. 17A).

The second conductive film 400 is a conductive film formed of a conductive material by a sputtering method or the like, which is a material containing a conductive material or a semiconductor material as its main component.

For example, after forming Ti (titanium) to have a film thickness of 100 nm, Al (aluminum) is formed to have a film thickness of 300 nm. Besides the stacked layer of Ti (titanium) and Al (aluminum), the first conductive film can be formed using any material without particular limitation as long as the structure thereof contains at least one layer of the following: a metal material such as Ta (tantalum), Ti (titanium), W (tungsten), or chromium (Cr); silicide which is a compound of these metal materials and silicon; a material such as polysilicon having N-type or P-type conductivity; and a material containing a low resistance metal material such as Cu (copper) or Al (aluminum) as its main component.

Next, the second conductive film 400 is etched after transferring mask patterns thereto by a lithography method. Accordingly, a first wiring 401*a* and a second wiring 401*b* are formed in the first TFT region 1001, and a third wiring 401*c* and a first reflective electrode 402*a* are formed in the second TFT region 1002. Thereafter, the transferred resist masks are removed. Note that the first reflective electrode 402*a* is used as both a reflective electrode and a pixel electrode (see FIG. 17B).

Note that the wirings formed here are each appropriately connected to a TFT, the gate wiring which is exposed through the contact region, other elements, or the like, in accordance with the mask patterns.

Next, a transparent conductive film 600 is formed (see FIG. 17C).

The transparent conductive film 600 is a conductive film having high transmissivity which is formed using a sputtering method or the like.

For example, indium tin oxide (hereinafter, referred to as ITO) is formed to have a film thickness of 90 nm. Besides ITO, the transparent conductive film 600 can be formed using a film including a material such as indium tin oxide containing a Si element (hereinafter, referred to as ITSO), or IZO (Indium Zinc Oxide) where indium oxide is mixed with 2 to 20% of zinc oxide (ZnO); or a compound with the combination thereof.

Figure 18:
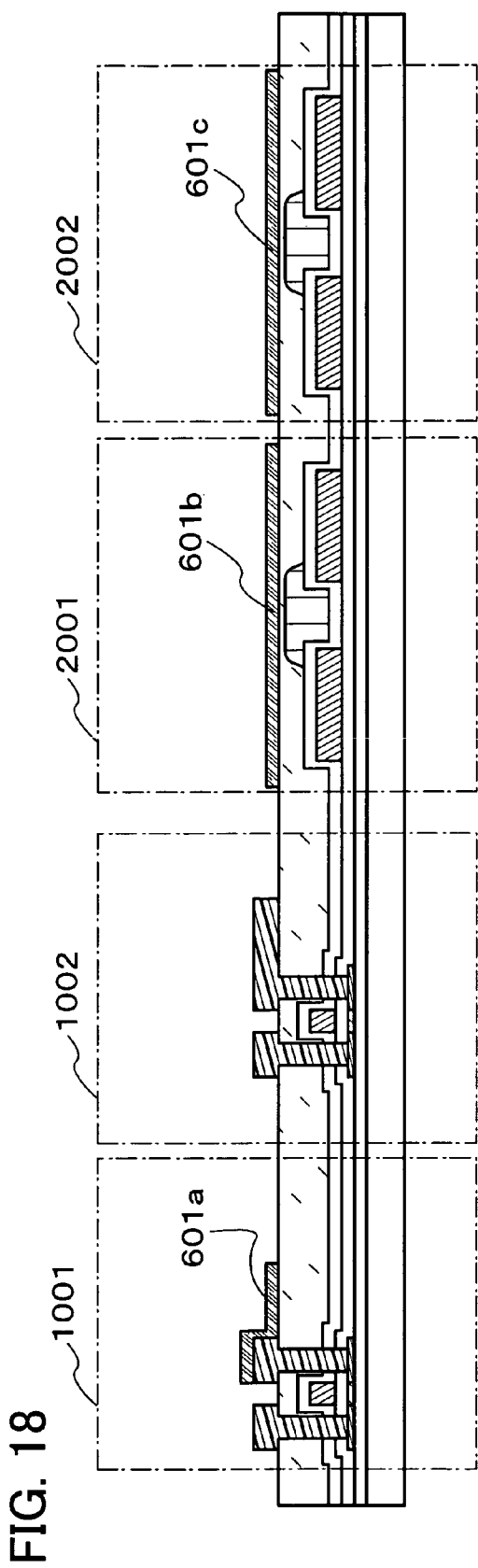
FIG. 18 is a method for manufacturing a top-gate TFT and an opposite region (a cross-sectional view)

Then, the transparent conductive film 600 is etched after transferring mask patterns thereto by a lithography method. Accordingly, a first transparent electrode 601*a* is formed in the first TFT region, a second transparent electrode 601*b* is formed in the first opposite region, and a third transparent electrode 601*c* is formed in the second opposite region. Thereafter, the transferred resist masks are removed (see FIG. 18).

As described through the above, the following can be manufactured over one substrate: the transmission or semi-transmission type first TFT region 1001; the reflective type second TFT region 1002; the first opposite region 2001 which is disposed on the opposite side of the first TFT region 1001; and the second opposite region 2002 which is disposed on the opposite side of the second TFT region 1002.

Next, a liquid crystal panel is manufactured by the method described in Embodiment Mode 1.

Figure 31:
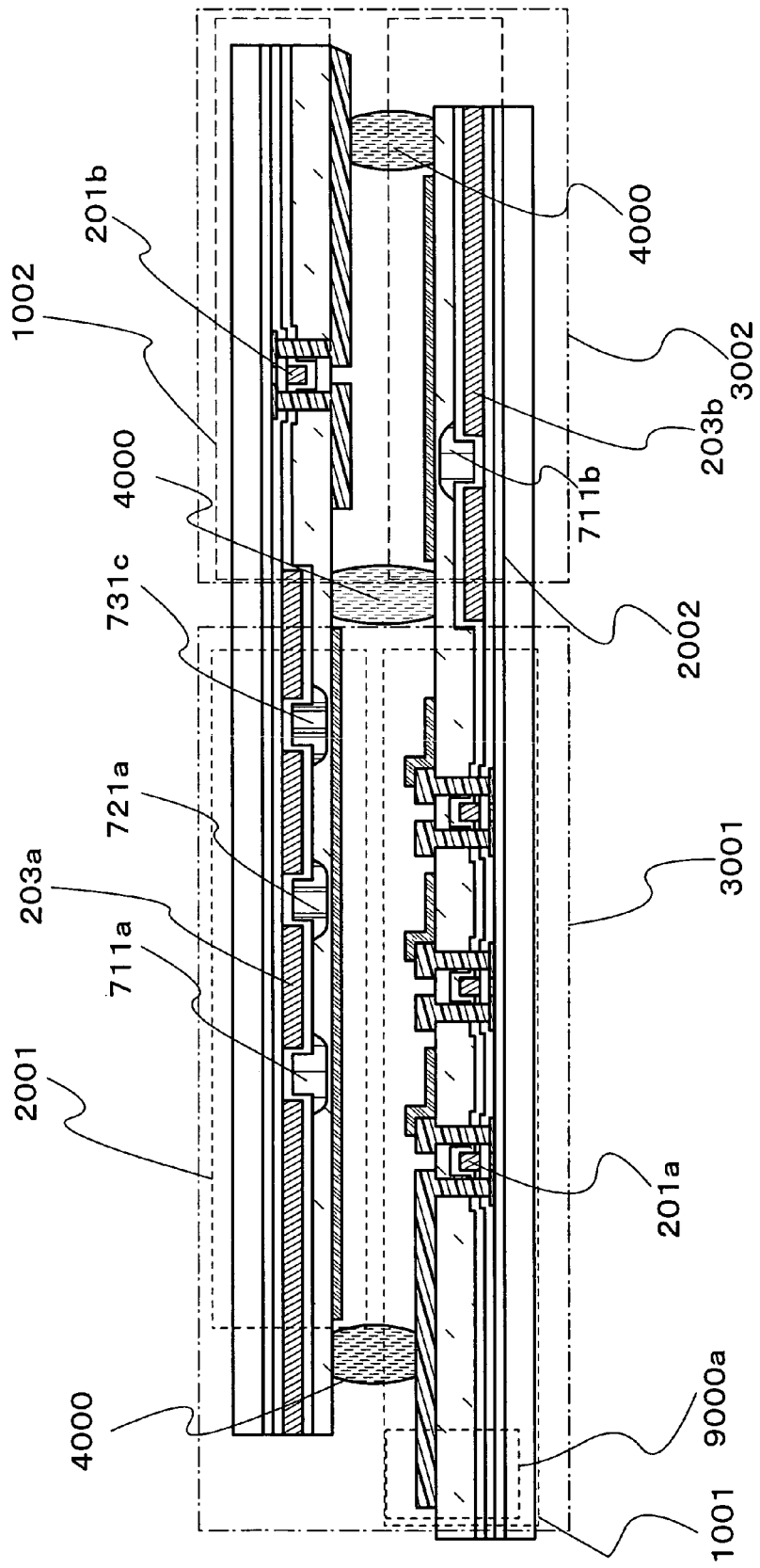
FIG. 31 is a cross-sectional view of a double-sided display device (Embodiment Mode 13)

The liquid crystal panel has a first liquid crystal display region 3001 and a second liquid crystal display region 3002. The first liquid crystal display region 3001 has an FPC connection wiring 9000*a* therein, and the second liquid crystal display region 3002 has an FPC connection wiring 9000*b* therein (see FIG. 31; FIG. 31 exemplifies a view where a basic disposition of Embodiment Mode 1 is applied to this embodiment mode).

As described through the above of this embodiment mode, the number of the masks, the number of device processing times, and the materials that are used can be reduced. Consequently, the yield can be improved and the cost can be reduced.

Embodiment Mode 14

Figure 32:
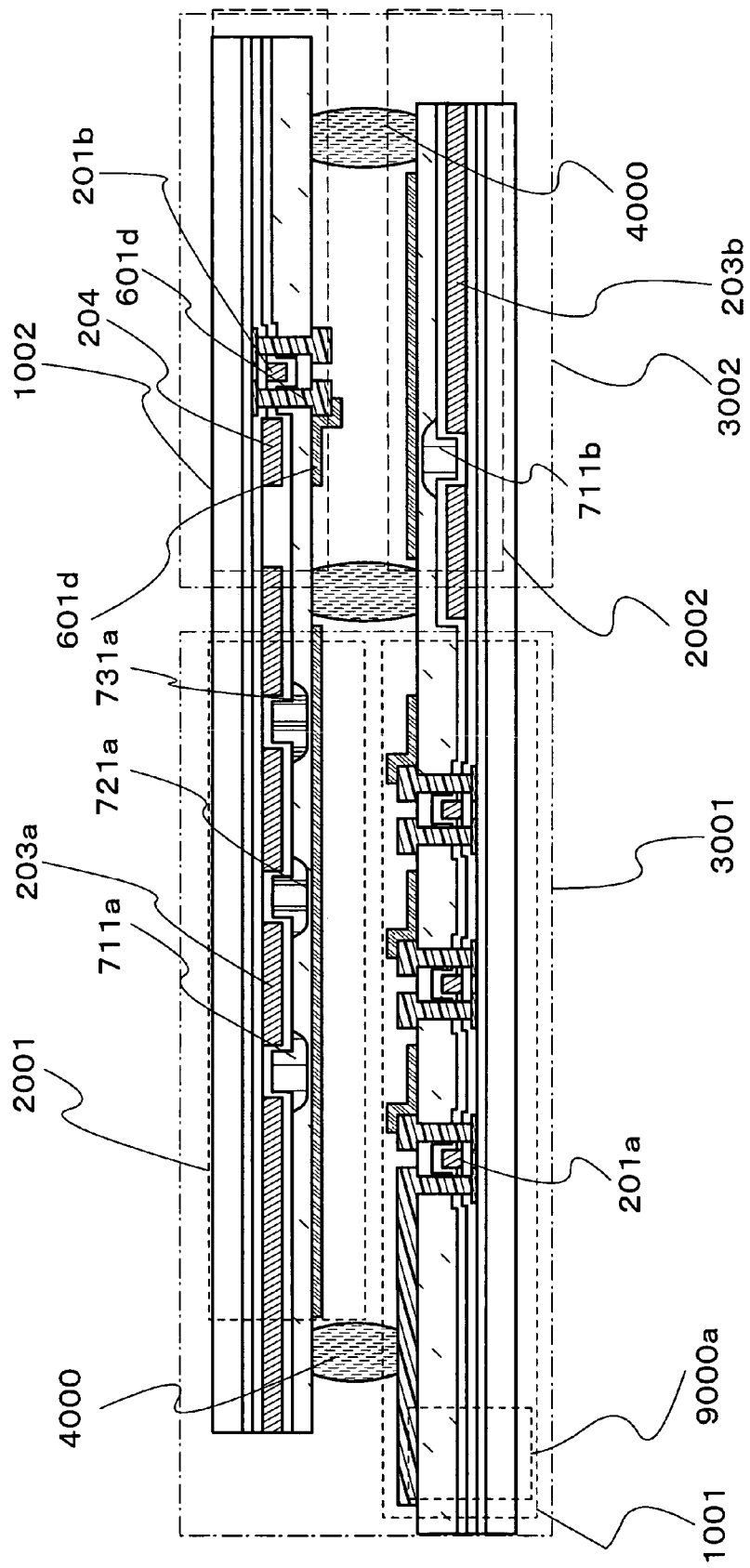
FIG. 32 is a cross-sectional view of a double-sided display device (Embodiment Mode 14)

In Embodiment Mode 13, the same material as the wiring is used for the reflective electrode which is formed in the second TFT region 1002; however, a transparent electrode may be used for a pixel electrode and a gate electrode material may be used for a reflective electrode without using the reflective electrode as both a reflective electrode and a pixel electrode (see FIG. 32).

As the manufacturing method of this case, in the case of Embodiment Mode 4, a second reflective electrode 204 may be formed at the time of forming the mask patterns of the first conductive film 200, a fourth wiring 401*d* may be formed instead of the first reflective electrode 402*a* at the time of forming the mask patterns of the second conductive film 400, and a fourth transparent electrode 601*d* may be formed at the time of forming the mask patterns of the transparent conductive film 600.

Embodiment Mode 15

This embodiment mode will show an example of a manufacturing method of the substrate described in Embodiment Mode 2. Note that, since the same manufacturing method as Embodiment Mode 13 is used, the explanation is made only for portions different from Embodiment Mode 13.

As the manufacturing method of this embodiment mode, a third reflective electrode 205 is formed in a second opposite region 2002 without forming a second black matrixes 203*b* at the time of forming the mask patterns of the first conductive film 200 in the case of Embodiment Mode 13 (first black matrixes 203*a* are formed in a first opposite region 2001).

In addition, without forming a color filter regions in the first opposite region 2001 and the second opposite region 2002 at the time of forming the color filter regions, the color filter regions may be formed so as to be disposed below a transparent electrode of a first TFT region 1001 and below a transparent electrode of a second TFT region 1002.

Moreover, a black organic film is used for the second interlayer insulating film 500 and the second interlayer insulating film 500 over the color filter regions is removed.

Further, a fourth wiring 401*d* is formed without forming the first reflective electrode 402*a* at the time of forming the mask patterns of the second conductive film 400, and a fourth transparent electrode 601*d* is formed without forming the mask patterns of the transparent conductive film 600.

Note that, the color filter regions and the second interlayer insulating film 500 are formed after forming the first interlayer insulating film 300; however, as described above, the color filter regions may be formed first or the second interlayer insulating film 500 may be formed first.

In the case of forming the second interlayer insulating film 500 first, the second interlayer insulating film at the place where the color filter regions are disposed may be removed by a mask pattern transferring technique.

Next, a liquid crystal display panel is assembled in the same manner as Embodiment Mode 2.

Figure 33:
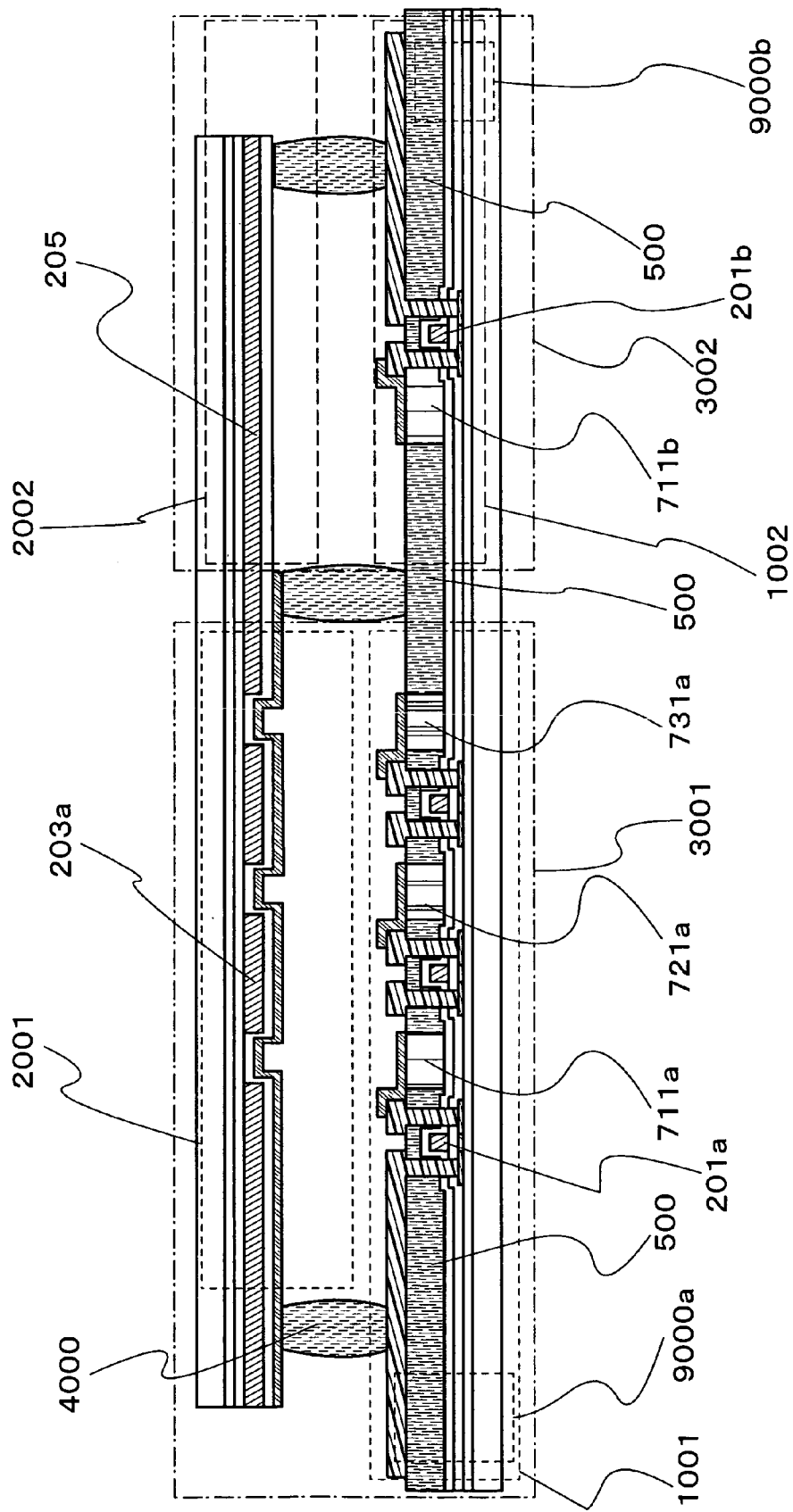
FIG. 33 is a cross-sectional view of a double-sided display device (Embodiment Mode 15)

As described through the above, a liquid crystal display device capable of double-sided display having a first liquid crystal display region 3001 and a second liquid crystal display region 3002 without a color filter region in the opposite regions can be manufactured (see FIG. 33).

By employing this embodiment mode, a region serving as a black matrix can be formed in the first TFT region 1001 and the first opposite region 2001; therefore, the contrast of the first liquid crystal display region 3001 can be improved.

Embodiment Mode 16

Figure 34:
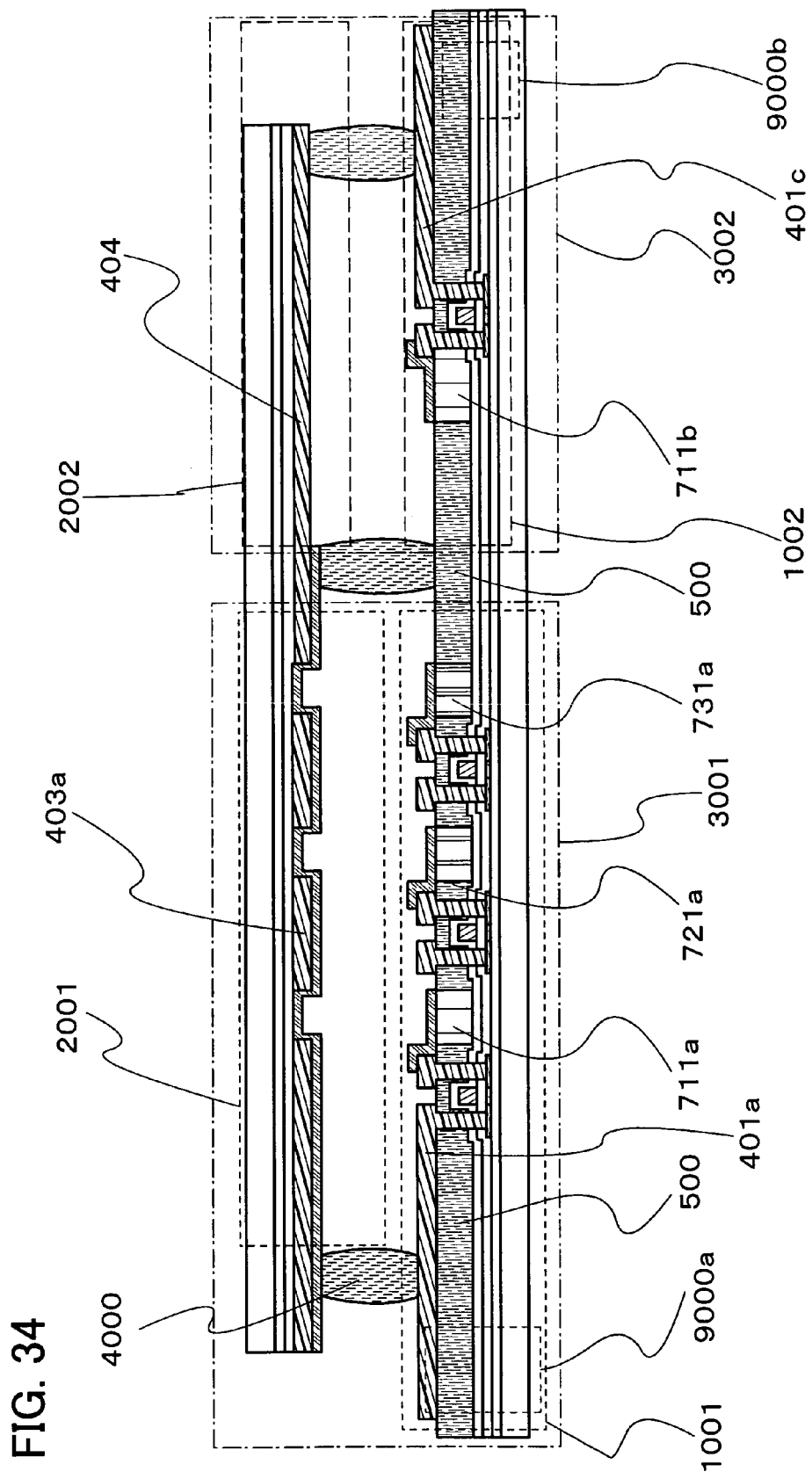
FIG. 34 is a cross-sectional view of a double-sided display device (Embodiment Mode 16)

The same material as the first conductive film 200 is used for the third reflective electrode 205 of the second opposite region 2002 in Embodiment Mode 15; however, the same material as the second conductive film 400 can be used for the third reflective electrode 205 (see FIG. 34).

As the manufacturing method of this case, in the case of Embodiment Mode 15, without forming the third reflective electrode 205 in the second opposite region 2002 at the time of forming the mask patterns of the first conductive film 200, a fourth reflective electrode 404 may be formed in the second opposite region 2002 at the time of forming the mask patterns of the second conductive film 400.

By employing this embodiment mode, as with Embodiment Mode 15, a region serving as a black matrix can be formed in the first TFT region 1001 and the first opposite region 2001; therefore, the contrast of the first liquid-crystal display region 3001 can be improved.

Further, in this embodiment mode, since a transparent electrode and the fourth reflective electrode 404 are in contact with each other in the first opposite region 2001, the resistance of the electrodes in the opposite regions can be reduced.

The present application is based on Japanese Patent Application serial No. 2005-347661 filed on Dec. 1, 2005 in Japanese Patent Office, the entire contents of which are hereby incorporated by reference.

What is claimed is:

1. A display device comprising:
    a first substrate where a first thin film transistor region and a first opposite region are formed;
    a second substrate where a second thin film transistor region and a second opposite region are formed; and
    a first liquid crystal material and a second liquid crystal material;
    wherein the first thin film transistor region and the second opposite region are opposed from each other with the first liquid crystal material interposed therebetween, and the second thin film transistor region and the first opposite region are opposed from each other with the second liquid crystal material interposed therebetween,
    wherein a gate electrode formed in the first thin film transistor region and a black matrix formed in the first opposite region are in contact with the first substrate, and
    wherein a gate electrode formed in the second thin film transistor region and a black matrix formed in the second opposite region are in contact with the second substrate.

2. The display device according to claim 1, further comprising a reflective electrode formed in the second thin film transistor region,
    wherein the gate electrode formed in the second thin film transistor region and the reflective electrode formed in the second thin film transistor region are in contact with the second substrate.

3. The display device according to claim 1,
    wherein interlayer insulating films formed in the first thin film transistor region, the second thin film transistor region, the first opposite region, and the second opposite region comprise the same material.

4. The display device according to claim 1,
    wherein a first liquid crystal display device comprising the first thin film transistor region and the second opposite region is a transmission type liquid crystal display device, and
    wherein a second liquid crystal display device comprising the second thin film transistor region and the first opposite region is a semi-transmission type liquid crystal display device.

5. The display device according to claim 1,
    wherein the black matrix formed in the first opposite region and the black matrix formed in the second opposite region are interposed between the first substrate and the second substrate.

6. The display device according to claim 1,
    wherein the gate electrode formed in the first thin film transistor region, the black matrix formed in the first opposite region, the gate electrode formed in the second thin film transistor region, and the black matrix formed in the second opposite region comprise the same material.

7. A display device comprising:
    a first substrate where a first thin film transistor region and a first opposite region are formed;
    a second substrate where a second thin film transistor region and a second opposite region are formed; and
    a first liquid crystal material and a second liquid crystal material;
    wherein the first thin film transistor region and the second opposite region are opposed from each other with the first liquid crystal material interposed therebetween, and the second thin film transistor region and the first opposite region are opposed from each other with the second liquid crystal material interposed therebetween,
    wherein a wiring formed in the first thin film transistor region and a black matrix formed in the first opposite region are in contact with the first substrate, and
    wherein a wiring formed in the second thin film transistor region and a black matrix formed in the second opposite region are in contact with the second substrate.

8. The display device according to claim 7, further comprising a reflective electrode formed in the second thin film transistor region,
    wherein the wiring formed in the second thin film transistor region and the reflective electrode formed in the second thin film transistor region are in contact with the second substrate.

9. The display device according to claim 7,
    wherein interlayer insulating films formed in the first thin film transistor region, the second thin film transistor region, the first opposite region, and the second opposite region comprise the same material.

10. The display device according to claim 7,
    wherein a first liquid crystal display device comprising the first thin film transistor region and the second opposite region is a transmission type liquid crystal display device, and wherein a second liquid crystal display device comprising the second thin film transistor region and the first opposite region is a semi-transmission type liquid crystal display device.

11. The display device according to claim 7,
wherein the black matrix formed in the first opposite region and the black matrix formed in the second opposite region are interposed between the first substrate and the second substrate.

12. The display device according to claim 7,
wherein the wiring formed in the first thin film transistor region, the black matrix formed in the first opposite region, the wiring formed in the second thin film transistor region, and the black matrix formed in the second opposite region comprise the same material.

* * * * *